(12) United States Patent
Nakashima et al.

(10) Patent No.: US 12,163,046 B2
(45) Date of Patent: Dec. 10, 2024

(54) WATER-BASED COATING COMPOSITION AND METHOD FOR FORMING MULTILAYER COATING FILM USING SAID COMPOSITION

(71) Applicant: BASF Coatings GmbH, Münster (DE)

(72) Inventors: Hisayuki Nakashima, Yokohama (JP); Hardy Reuter, Muenster (DE); Souichi Mori, Yokohama (JP)

(73) Assignee: BASF COATINGS GMBH, Muenster (DE)

( * ) Notice: Subject to any disclaimer, the term of this patent is extended or adjusted under 35 U.S.C. 154(b) by 573 days.

(21) Appl. No.: 17/605,700

(22) PCT Filed: Mar. 31, 2020

(86) PCT No.: PCT/EP2020/059087
§ 371 (c)(1),
(2) Date: Oct. 22, 2021

(87) PCT Pub. No.: WO2020/216584
PCT Pub. Date: Oct. 29, 2020

(65) Prior Publication Data
US 2022/0162472 A1    May 26, 2022

(30) Foreign Application Priority Data
Apr. 26, 2019  (EP) ..................................... 19171235

(51) Int. Cl.
| | | |
|---|---|---|
| C08G 18/32 | (2006.01) | |
| B05D 7/00 | (2006.01) | |
| B05D 7/14 | (2006.01) | |
| C08G 18/42 | (2006.01) | |
| C08G 18/75 | (2006.01) | |
| C09D 175/02 | (2006.01) | |
| C09D 175/06 | (2006.01) | |

(52) U.S. Cl.
CPC ............ C09D 175/06 (2013.01); B05D 7/14 (2013.01); B05D 7/572 (2013.01); C08G 18/3228 (2013.01); C08G 18/42 (2013.01); C08G 18/755 (2013.01); C09D 175/02 (2013.01); *B05D 2201/02* (2013.01); *B05D 2202/00* (2013.01); *B05D 2401/20* (2013.01); *B05D 2420/01* (2013.01); *B05D 2420/02* (2013.01); *C08L 2201/54* (2013.01); *C08L 2207/53* (2013.01)

(58) Field of Classification Search
CPC ................ C09D 175/06; C09D 175/02; C08G 18/3228; C08G 18/42; C08G 18/755; B05D 7/14; B05D 7/572
See application file for complete search history.

(56) References Cited

U.S. PATENT DOCUMENTS

| | | | |
|---|---|---|---|
| 4,914,148 A | 4/1990 | Hille et al. | |
| 5,368,944 A | 11/1994 | Hartung et al. | |
| 5,623,016 A | 4/1997 | Klein et al. | |
| 5,658,617 A | 8/1997 | Gobel et al. | |
| 6,001,915 A | 12/1999 | Schwarte et al. | |
| 6,632,915 B1 * | 10/2003 | Schwarte ............... | C08G 18/12 526/302 |
| 8,580,385 B2 | 11/2013 | Kitagawa et al. | |
| 9,090,732 B2 | 7/2015 | Poppe et al. | |
| 9,353,287 B2 | 5/2016 | Groenewolt et al. | |
| 9,803,103 B2 | 10/2017 | Reuter et al. | |
| 9,868,134 B2 | 1/2018 | Steinmetz et al. | |
| 10,100,220 B2 | 10/2018 | Koyama et al. | |
| 10,344,181 B2 | 7/2019 | Steinmetz et al. | |
| 10,836,927 B2 | 11/2020 | Reuter et al. | |
| 10,920,100 B2 | 2/2021 | Corten et al. | |
| 2008/0220173 A1 | 9/2008 | Poppe et al. | |
| 2016/0152862 A1 | 6/2016 | Reuter et al. | |
| 2016/0319151 A1 | 11/2016 | Steinmetz et al. | |
| 2018/0002476 A1 | 1/2018 | Reuter et al. | |
| 2018/0141084 A1 | 5/2018 | Bauer et al. | |
| 2018/0312720 A1 | 11/2018 | Steinmetz et al. | |
| 2018/0346740 A1 | 12/2018 | Andersen et al. | |

FOREIGN PATENT DOCUMENTS

| | | |
|---|---|---|
| CA | 3029921 A1 | 1/2018 |
| CN | 105829381 A | 8/2016 |
| DE | 4437535 A1 | 4/1995 |
| DE | 19948004 A1 | 7/2001 |
| EP | 0228003 A1 | 7/1987 |
| EP | 0634431 A1 | 1/1995 |
| EP | 0649865 A1 | 4/1995 |
| EP | 1852478 B1 | 1/2011 |
| JP | 2004358462 A | 12/2004 |
| JP | 2007297545 A | 11/2007 |
| JP | 2013213151 A | 10/2013 |
| JP | 2017508601 A | 3/2017 |
| RU | 2678207 C2 | 1/2019 |

(Continued)

OTHER PUBLICATIONS

European Search Report for EP Patent Application No. 19171235.5, Issued on Oct. 22, 2019, 3 pages.
Hermann Römpp, "Rompp Lexikon, Lacke und Druckfarben", 1998, p. 176 and 451. Translation not available.
Krüger, et al., "Hydroxylzahlbestimmung an Polyetheralkoholen unter 4-Dimethylaminopyridin-Katalyse", Plaste und Kautschuk, vol. 5, 1982, p. 274. Translation not available.
International Search Report and Written Opinion for corresponding PCT/EP2020/059087 mailed May 18, 2020, 7 Pages.

*Primary Examiner* — Michael L Leonard
(74) *Attorney, Agent, or Firm* — Armstrong Teasdale LLP

(57) ABSTRACT

Described herein are aqueous coating compositions including at least one dispersion of core/shell particles containing a polyurethane resin as core portion and a crosslinked acrylic resin as shell portion and at least one aqueous polyurethane-polyurea dispersion containing crosslinked polyurethane-polyurea particles. Also described herein is a method for forming a multilayer coating on a substrate using the aqueous coating compositions as basecoat compositions. Also described herein is a multicoat paint system produced by the method.

20 Claims, No Drawings

(56) References Cited

FOREIGN PATENT DOCUMENTS

| WO | 9115528 A1 | 10/1991 |
|---|---|---|
| WO | 9215405 A1 | 9/1992 |
| WO | 2006042585 A1 | 4/2006 |
| WO | 2008074490 A1 | 6/2008 |
| WO | 2009077182 A1 | 6/2009 |
| WO | 2010082607 A1 | 7/2010 |
| WO | 2013027093 A1 | 2/2013 |
| WO | 2015007427 A1 | 1/2015 |
| WO | 2016177514 A1 | 11/2016 |
| WO | 2017088988 A1 | 6/2017 |

* cited by examiner

WATER-BASED COATING COMPOSITION AND METHOD FOR FORMING MULTILAYER COATING FILM USING SAID COMPOSITION

CROSS-REFERENCE TO RELATED APPLICATIONS

This application is a U.S. National Phase Application of International Patent Application No. PCT/EP2020/059087, filed Mar. 31, 2020, which claims priority to European Patent Application No. 19171235.5, filed Apr. 26, 2019, the entire contents of which are hereby incorporated by reference herein.

The present invention relates to aqueous coating compositions, preferably pigmented aqueous basecoat compositions, comprising at least one dispersion of core/shell particles containing a polyurethane resin as core portion and a crosslinked acrylic resin as shell portion and at least one aqueous polyurethane-polyurea dispersion containing crosslinked polyurethane-polyurea particles. Moreover, the present invention relates to a method for forming a multilayer coating on a substrate using the inventive aqueous coating compositions as basecoat compositions. Finally, the present invention relates to a multicoat paint system produced by the process of the invention.

STATE OF THE ART

Multicoat paint systems on metallic or plastics substrates, examples being multicoat paint systems in the automobile industry sector, are known. Starting from the metallic substrate, multicoat paint systems of this kind generally comprise a separately cured electrocoat film, a film which is applied directly to the electrocoat film and is cured separately, usually referred to as primer, at least one film layer which comprises color pigments and/or effect pigments and is generally referred to as basecoat film, and a clearcoat film.

On plastics substrates, which are relevant in the sector of components for installation in or on vehicles, it is generally likewise the case that corresponding basecoat and clearcoat films are applied. In some cases, certain primers or adhesion primers are applied before the basecoat material is applied.

The fundamental compositions and functions of the stated coats, and of the coating materials necessary for the construction of these coats—i.e. electrocoat materials, primers, basecoat materials comprising color and/or effect pigments and clearcoat materials—are known. Thus, for example, the fundamental purpose of the electrophoretically applied electrocoat is to protect the substrate from corrosion. The primary function of the primer coat is to provide protection from mechanical exposure such as stone chipping and to fill out irregularities of the substrate. The basecoat is primarily responsible for producing esthetic qualities such as color and/or effects such as flock, while the clearcoat that then follows serves in particular to provide the multicoat paint system with scratch resistance and gloss.

Producing these multicoat paint systems generally involves electrophoretically depositing or applying an electrocoat material, more particularly a cathodic electrocoat material, on the metallic substrate, such as an automobile body. The metallic substrate may undergo various pretreatments prior to the deposition of the electrocoat material—for example, known conversion coatings such as phosphate coatings, more particularly zinc phosphate coats, may be applied. The operation of depositing the electrocoat material takes place in general in corresponding electrocoating tanks.

Following application of the electrocoat material, the coated substrate is removed from the tank and is optionally rinsed and subjected to flashing and/or interim drying, and lastly the applied electrocoat material is cured. Film thickness of the cured electrocoating should be approximately 15 to 25 micrometers.

The primer material is then applied directly to the cured electrocoat, optionally subjected to flashing and/or interim drying, and is thereafter cured. To allow the cured primer coat to fulfill the objectives identified above, film thicknesses of 25 to 45 micrometers are necessary. Applied directly to the cured primer coat is a basecoat material comprising color and/or effect pigments and optionally subjected to flashing and/or interim drying. This basecoat film thus produced is then coated with a clearcoat material without separate curing. The clearcoat film can be subjected to flashing and/or interim drying before the basecoat film and any clearcoat film are jointly cured (so-called 2 coat 1 bake (2C1B) method). Whereas the cured basecoat has comparatively low film thicknesses of 10 to 20 micrometers, film thicknesses of 30 to 60 micrometers are used for the cured clearcoat, to achieve the technological applications properties described. The application of primer, basecoat, and clearcoat materials may take place, for example, via pneumatic and/or electrostatic spray application known to the skilled person. At present, primer and basecoat materials are already being employed increasingly in the form of aqueous coating materials due to environmental reasons.

The multicoat paint systems produced with the 2C1B method are generally able to fulfill the requirements in terms of technological application properties and esthetic profile imposed by the automobile industry. However increasingly strict environmental and economic regulations render it necessary to simplify the comparatively complex production operation described before.

Particularly in connection with metal substrates, there are approaches to omit the separate step of curing the coating composition applied directly to the cured electrocoat film (that is, the coating composition referred to as primer within the standard method described above), and at the same time, optionally, to lower the film thickness of the coating film produced from this coating composition (so-called 3 coat 1 bake (3C1B) method). In this method, the coating film which is not separately cured is then frequently called basecoat film (and no longer primer film) or, to distinguish it from a second basecoat film applied atop, it is called the first basecoat film. In some cases, there are attempts to even omit this basecoat/first basecoat film (in this case merely one basecoat film is produced directly on the electrocoat film, over which, without a separate curing step, a clearcoat material is applied).

Avoiding a separate curing step for the coating composition applied directly to the electrocoat film is very advantageous from environmental and economic view because this saves energy and allows the production operation to proceed in substantially less amount of time.

Similar methods are known in connection with plastic processes, in which no electrocoat film is necessary and therefore omitted. The system for joint curing, composed of first basecoat material, second basecoat material and clearcoat material is therefore applied, for example, directly to the plastic substrate, which may have been given a surface-activating pretreatment, or else to a primer film or adhesion primer film which has first been applied to the substrate.

Likewise known are refinish methods for the re-establishment of multicoat paint systems in which the multicoat paint systems are prepared as described above but contain certain defects. Such refinish methods take place, for example, by local repair of defects (spot repair), or by complete recoating of the original finish bearing the defects (dual finishing). In this case, in general, after local sanding of the defects, systems as described above, composed of primer, basecoat, and clearcoat or of first basecoat, second basecoat and clearcoat, are applied. Also possible is the application of only one basecoat and of a clearcoat applied thereto, followed by joint curing. In this method, the multicoat paint system with defects (original finish) serves as substrate.

Although the technological properties of existing multicoat paint systems are already often sufficient to meet the specifications of the automobile manufacturers, there continues to be a need for them to be improved. This need particularly exists in connection with the last-described 3C1B method for producing multicoat paint systems. Even the standard methods described earlier on for producing multicoat paint systems, however, are still amenable to optimization in this respect.

For instance, dispensing with the separate curing of the coating film applied directly to the electrocoat (i.e. the first basecoat material) prior to the application of further coating materials, such as a second basecoat material and a clearcoat material, may lead to the formation of bubbles beneath the surface of the overall paint system, which may burst open in the course of final curing. The holes that are formed in the paint system as a result, also called pinholes and pops, lead to a disadvantageous visual appearance. The amounts of organic solvents and/or water involved, and also the quantity of air introduced as a result of the application procedure, are too great to allow the overall amount to escape from the multicoat paint system in the course of curing, without giving rise to defects. In the case of a 2C1B process, where the primer film is baked separately before the production of a usually comparatively thin basecoat film, the total amount of organic solvent, water and air is much lower than in the 3C1B process, thus resulting per se in a lower risk of unwanted bubble formation during the final curing step.

However, even in the production of multicoat paint systems where the use of the coating material referred to in the standard operation as primer is completely abandoned, the problems described with pinholes and pops are frequently encountered. This is due to the fact that the basecoat film thickness required in this process is generally greater by comparison with the standard 2C1B process in order for the desired properties to be obtained. Thus, the overall film thickness of coating films which must be cured in the final curing step is also substantially higher than in the 2C1B method.

Furthermore, other relevant properties are not always satisfactorily achieved when multicoat paint systems are constructed using the 2C1B or the 3C1B process described. A challenge is posed accordingly by the attainment of a high-grade overall appearance, which is influenced in particular by good flow of the coating materials used. In this case the coating materials must show an appropriate rheological behavior (application behavior), specifically a pronounced structural viscosity. This structural viscosity exists when the coating material has a low viscosity at high shear rates existing during the application process (generally spray application) but a viscosity that is high enough so that the coating material is sufficiently sag-resistant and does not run from the substrate or form runs after application to the substrate. Similar comments apply in respect of mechanical properties such as the adhesion. In this connection as well, attaining an appropriate quality represents a great challenge.

The environmental profile of multicoat paint systems is also still in need of improvement. A contribution in this respect has, indeed, already been achieved through the replacement of a significant fraction of organic solvents by water in aqueous paints. A significant improvement, nevertheless, would be achievable by an increase in the solids content of such paints. However, especially in aqueous basecoat materials, which comprise color pigments and/or effect pigments, it is very difficult to increase the solids content while at the same time maintaining acceptable storage stability (settling behavior) and appropriate rheological properties or pronounced structural viscosity.

The properties of coating materials or paints, examples being aqueous basecoat materials, are critically determined by the components they contain—for example, by polymers employed as binders.

The prior art, accordingly, describes a wide variety of specific polymers, their use in coating materials, and their advantageous effect on various performance properties of paint systems and coatings.

Patent application JP2004-358462 A1 discloses the use of a first aqueous basecoat composition comprising (i) an acrylic resin emulsion having a specific glass transition temperature, acid value and hydroxyl group value, (ii) a urethane resin emulsion having a specific acid value and (iii) a curing agent in a 3C1B method. According to this document, use of this composition in a 3C1B method results in a multilayer coating having excellent surface smoothness by effectively preventing mixing of the first and second basecoat coating film.

Patent application JP 2007-297545 A1 discloses the use of a second aqueous basecoat composition comprising (i) specific quantities of an emulsion resin obtained by emulsion polymerizing a mixture of specific vinyl monomers, (ii) an amide group-containing water-soluble acrylic resin, (iii) a urethane resin emulsion and (iv) a curing agent in a 3C1B method, resulting in excellent appearance and water resistance of the obtained multilayer coating.

In patent application WO 2010/082607 A1, a first aqueous basecoat composition comprising (i) an acrylic resin, (ii) a curing agent and (iii) a urethane resin emulsion as well as its use in a 3C1B method to produce a multilayer coating having excellent smoothness, vividness and chip resistance is disclosed.

However, when the coating compositions disclosed in the aforementioned patent applications are used in a 3C1B method where no preliminary heating is carried out after applying the first aqueous basecoat composition, layer mixing occurs between the first coating film and the second coating film and it is not possible to obtain a multilayer coating system having a good appearance.

In WO 2013/027093 A1, an aqueous coating composition comprising a core/shell type emulsion resin containing an acrylic resin as the core portion and a polyurethane resin as the shell portion, wherein the mass ratio of the core portion and the shell portion in the aforementioned core/shell type emulsion resin is between 20/80 and 80/20 is described. This coating composition can be used in 3C1B processes as first and/or second basecoat composition and provides sufficient optical and mechanical resistance. However, if this composition is used in a low bake 3C1B process, where curing of all 3 applied layers is performed at temperatures of lower than 100° C., the stone chipping resistance, the adhesion in refinish applications and the obtained hardness of the multilayer coating system is not sufficient.

Object

Therefore, an object of the present invention is to provide an aqueous coating composition, preferably a pigmented aqueous basecoat composition, which allows advantageous performance properties to be obtained to in paint systems, especially multicoat paint systems, produced using such an aqueous coating composition. Qualities to be achieved above all should include good optical properties, more particularly a good pinholing behavior and good anti-run stability. The mechanical properties such as the adhesion or stonechip resistance, should to be outstanding as well. Moreover, the aqueous coating material should possess good storage stability and should have a high solids content. Despite the high solids content, the rheological behavior of the coating composition should be outstanding.

A further object of the present invention is to provide a process for producing a multicoat paint system, wherein the inventive coating material is applied directly to the substrate or the electrocoat system and is cured in a joint curing step with further coating films applied thereafter. Despite this process simplification, the resulting multicoat paint systems should exhibit outstanding stability with respect to pinholes. Moreover, multicoat paint systems in which the coating film(s) disposed between electrocoat and clearcoat can have variable film thicknesses and where no problems with pinholes occur even at relatively high film thicknesses should be provided. In terms of overall appearance and adhesion, the quality achieved with this process should at least be comparable to, preferably better than, the standard 2C1B process.

Technical Solution

It has been found that the stated objects can be achieved by an aqueous coating composition, preferably a pigmented aqueous basecoat composition, comprising:
(a) at least one aqueous dispersion of core/shell type particles comprising a polyurethane resin as the core portion and a crosslinked acrylic resin as the shell portion, wherein the particles are obtained by:
  (i) initially charging an aqueous dispersion of at least one polyurethane resin (P) as core portion, and then
  (ii) polymerizing a mixture of olefinically unsaturated monomers in the presence of the polyurethane core portion to obtain the crosslinked acrylic resin (A) shell portion,
  wherein:
  (ii-1) the polymerizing occurs in the presence of a water-soluble initiator;
  (ii-2) a metered addition of the olefinically unsaturated monomers occurs such that a concentration of 6% by weight, based on a total amount of the olefinically unsaturated monomers, in a reaction solution of the polymerizing is not exceeded during the entire duration of the polymerizing; and
  (ii-3) the mixture of the olefinically unsaturated monomers comprises at least one polyolefinically unsaturated monomer, and
(b) at least one aqueous polyurethane-polyurea dispersion comprising polyurethane-polyurea particles having an average particle size of 40 to 2,000 nm and a gel fraction of at least 50%, the polyurethane-polyurea particles contain, in each case in reacted form:
at least one polyurethane prepolymer (PP) comprising isocyanate groups and comprising anionic groups and/or groups which are configured to be converted into anionic groups, and
at least one polyamine (PA) comprising two primary amino groups and one or two secondary amino groups The aqueous coating composition identified above will also be referred to below as aqueous coating composition of the invention, and accordingly is subject matter of the present invention. Preferred embodiments of the aqueous coating composition of the invention are evident from the description below and from the dependent claims.

The use of the aqueous coating composition of the invention renders it possible to achieve outstanding performance properties on the part of multicoat paint systems which have been produced using the aqueous coating composition in a 3C1B process preferably a 3C1B process where the simultaneous curing step is performed at temperatures below 100° C. Deserving of mention above all are good optical properties, more particularly good pinholing behavior and good anti-run stability, and good mechanical properties such as the adhesion or stonechip resistance. Pinholes are very small holes which are visible in the finished coating. They are one of the most common surface defects in spray paints. The defects referred to as pinholes in the description and patent examples which follow are characterized by funnel-shaped holes which continue into cylindrical tubes in the order of magnitude of a pinpoint impression, which have a mean diameter of the funnel opening of about 300 to 700 μm and a mean tube diameter of about 15 to 60 μm, and pass through the clearcoat and basecoat to reach the coat beneath. They may be the result of escaping gases, such as trapped air, or vaporizing solvents. The overall appearance and the adhesion of these multicoat paint systems are outstanding as well and are situated at least at the level of multicoat paint systems produced by way of the above-described standard process. At the same time, the aqueous coating composition exhibit good storage stability. Furthermore, the aqueous coating composition can be produced in an environmentally advantageous way, more particularly with a high solids content.

Likewise provided by the present invention is a method for forming a multilayer coating (MC) on a substrate (S) comprising the following steps:
(1) coating a first aqueous coating material (X) directly on the substrate (S) to form an uncured first coating film (x),
(2) coating a second aqueous coating material (Y) directly on the uncured first coating film obtained after step (1) to form an uncured second coating film (y),
(3) coating a clear coating material (Z) directly on the uncured second coating film obtained after step (2) to form a clear coating film (z), and then
(4) simultaneously curing these three coating films obtained after steps (1) to (3), characterized in that
the first aqueous coating material (X) and/or the second aqueous coating material (Y) are selected from an inventive aqueous coating composition.

The present invention also provides a multilayer coating (MC) produced by the inventive method.

DETAILED DESCRIPTION

If reference is made in the context of the present invention to an official standard, this of course means the version of the standard that was current on the filing date, or, if no current version exists at that date, then the last current version.

Inventive Aqueous Coating Composition:

The expression "aqueous coating composition" is known to the skilled person. It refers to a system which comprises as its dispersion medium not exclusively or primarily organic solvents (also called solvents); instead, it comprises as its dispersion medium a significant fraction of water. In the context of the present invention, "aqueous" is to be understood as meaning that the coating composition has a proportion of at least 20% by weight, preferably at least 25% by weight, particularly preferably at least 50% by weight of water, in each case based on the total amount of solvents contained (i.e. water and organic solvents). Of these, the proportion of water is preferably 60 to 100% by weight, in particular 70 to 98% by weight, particularly preferably 75 to 95% by weight, in each case based on the total amount of the solvents present.

Dispersion of Core/Shell Type Particles:

The first essential component of the aqueous coating composition is at least one dispersion of core/shell type particles comprising a polyurethane resin as the core portion and a crosslinked acrylic resin as the shell portion.

The dispersion (a) is characterized by the production steps (i) and (ii) thereof. In the first production step (i), an aqueous dispersion of a polyurethane resin (P) as core portion is initially charged.

Suitable saturated or unsaturated polyurethane resins (P) are described, for example, in DE 199 48 004 A1, page 4 line 19 to page 11 line 29 (polyurethane prepolymer B1), EP 0 228 003 A1, page 3 line 24 to page 5 line 40, EP 0 634 431 A1, page 3 line 38 to page 8 line 9, or WO 92/15405, page 2 line 35 to page 10 line 32.

The use of aliphatic, cycloaliphatic, aliphatic-cycloaliphatic, aromatic, aliphatic-aromatic and/or cycloaliphatic-aromatic polyisocyanates known to those skilled in the art is preferred for the preparation of the polyurethane resin (P). Particular preference is given to aliphatic and aliphatic-cycloaliphatic polyurethane resins.

The alcohol components used for the preparation of the polyurethane resins (P) are preferably saturated and unsaturated polyols known to those skilled in the art, and optionally, in minor amounts, also monoalcohols. Particularly diols and optionally, in minor amounts, triols are used for introduction of branches. Examples of suitable polyols are saturated or olefinically unsaturated polyester polyols and/or polyether polyols. The polyols used are especially polyester polyols, especially those having a number-average molecular weight of 400 to 5,000 g/mol. The number-average molar mass ($M_n$) was determined by means of a vapor pressure osmometer 10.00 (from Knauer) on concentration series in toluene at 50° C. with benzophenone as calibration substance for the determination of the experimental calibration constant of the measuring instrument used, by the method of E. Schröder, G. Müller, K.-F. Arndt, "Leitfaden der Polymercharakterisierung", Akademie-Verlag, Berlin, pp. 47-54, 1982.

Preferably, the polyurethane resin (P) initially charged in aqueous dispersion is a hydrophilically stabilized polyurethane resin (P). For hydrophilic stabilization or for increasing dispersibility in aqueous medium, the polyurethane resin (P) may contain the following modifying groups functional groups which can be converted to cations by neutralizing agents and/or quaternizing agents, and/or cationic groups (cationic modification) or functional groups which can be converted to anions by neutralizing agents, and/or anionic groups (anionic modification) or nonionic hydrophilic groups (nonionic modification) or combinations of the aforementioned groups. Such polyurethane resins (P) are referred to in the context of the present invention as ionically or nonionic hydrophilically stabilized polyurethane resins (P). Preference is given to ionically hydrophilically stabilized polyurethane resins (P).

As the person skilled in the art is aware, the functional groups for cationic modification are, for example, primary, secondary and/or tertiary amino groups, secondary sulfide groups and/or tertiary phosphine groups, especially tertiary amino groups and secondary sulfide groups (functional groups which can be converted to cationic groups by neutralizing agents and/or quaternizing agents). Mention should additionally be made of the cationic groups prepared from the aforementioned functional groups using neutralizing agents and/or quaternizing agents known to those skilled in the art, such as primary, secondary, tertiary and/or quaternary ammonium groups, tertiary sulfonium groups and/or quaternary phosphonium groups, especially quaternary ammonium groups and tertiary sulfonium groups.

As is well known, the functional groups for anionic modification are, for example, carboxylic acid, sulfonic acid and/or phosphonic acid groups, especially carboxylic acid groups (functional groups which can be converted to anionic groups by neutralizing agents), and anionic groups prepared from the aforementioned functional groups using neutralizing agents known to those skilled in the art, such as carboxylate, sulfonate and/or phosphonate groups.

The functional groups for nonionic hydrophilic modification are preferably poly(oxyalkylene) groups, especially poly(oxyethylene) groups.

The ionic hydrophilic modifications can, for example, be introduced into the polyurethane resin (P) by means of monomers containing the ionic or potentially ionic groups using compounds containing at least one group reactive towards isocyanate groups, preferably at least one hydroxyl group, as well as the modifying groups. The nonionic modifications are introduced as lateral or terminal groups in the polyurethane molecules, for example through the incorporation of poly(ethylene oxide) polymers. For introduction of the nonionic modifications, preference is given to using the polyether diols and/or alkoxy poly(oxyalkylene) alcohols known to those skilled in the art.

Preference is given to adding at least one solvent to the initially charged polyurethane dispersion, the solvent being miscible in any ratio with water and in any ratio with the mixture of olefinically unsaturated monomers. Particularly suitable solvents are N-methylpyrrolidone, N-ethylpyrrolidone and ether alcohols, such as especially methoxypropanol.

As the next preparation step (ii), the polymerization of a mixture of olefinically unsaturated monomers is performed in the presence of the polyurethane core portion by free-radical emulsion polymerization in the presence of at least one polymerization initiator to form the crosslinked acrylic resin shell portion.

The polymerization initiator used must be a water-soluble initiator (ii-1) and is preferably selected from the group consisting of potassium peroxodisulfate, sodium peroxodisulfate, ammonium peroxodisulfate, hydrogen peroxide, tert-butyl hydroperoxide, 2,2'-azobis(2-amidoisopropane)dihydrochloride, 2,2'-azobis(N,N'-dimethyleneisobutyramidine) di-hydrochloride, 2,2'-azobis(4-cyanopentanoic acid) and mixtures thereof. It is also possible to use known redox initiator systems as polymerization initiators. Such redox initiator systems contain at least one peroxide-containing compound in combination with a redox coinitiator, for example reducing sulfur compounds, for example bisulfites, sulfites, thiosulfates, dithionites or tetrathionates of alkali metals and ammonium compounds, sodium hydroxymethanesulfinate dihydrate and/or thiourea. For instance, it is possible to use combinations of peroxodisulfates with alkali metal or ammonium hydrogen sulfites, for example ammonium peroxodisulfate and ammonium disulfite. The weight ratio of peroxide-containing compounds to the redox coinitiators is preferably 50:1 to 0.05:1. In combination with the initiators or the redox initiator systems, it is additionally possible to use transition metal catalysts, for example iron salts, nickel salts, cobalt salts, manganese salts, copper salts, vanadium salts or chromium salts, such as iron (II) sulfate, cobalt (II) chloride, nickel (II) sulfate, copper(I) chloride, manganese (II) acetate, vanadium (III) acetate, manganese (II) chloride. Based on the monomers, these transition metal salts are used typically in amounts of 0.1 to 1000 ppm. For instance, it is possible to use combinations of hydrogen peroxide with iron (II) salts, for example 0.5 to 30% hydrogen peroxide and 0.1 to 500 ppm Mohr's salt.

Initiators are preferably used in an amount of 0.05 to 20% by weight, preferably 0.05 to 10% by weight, more preferably 0.1 to 5% by weight, based on the total weight of the olefinically unsaturated monomers used in step (ii).

Due to the use of the water-soluble initiator, the olefinically unsaturated monomers which are added to the initially charged aqueous dispersion can react immediately to give oligomers. These oligomers have a lower tendency of penetrating into the polyurethane core particles of the initially charged dispersion than the smaller monomers, thus leading to a crosslinked acrylate shell portion. If a water-insoluble initiator is used, the monomers penetrate the polyurethane core before forming oligomers, thus resulting in a crosslinked acrylate core portion and a polyurethane shell portion.

The polymerization is appropriately conducted at a temperature of 0 to 160° C., preferably 60 to 95° C.

In this context, preference is given to working with exclusion of oxygen, preferably in a nitrogen stream. In general, the polymerization is performed at standard pressure, but employment of lower pressures or higher pressures is also possible, especially when polymerization temperatures above the boiling point of the monomers and/or solvents are employed.

The inventive polymers are prepared by free-radical aqueous emulsion polymerization, and it is possible to add surfactants or protective colloids to the reaction medium. A list of suitable emulsifiers and protective colloids can be found, for example, in Houben Weyl, Methoden der organischen Chemie, volume XIV/1 Makromolekulare Stoffe, Georg Thieme Verlag, Stuttgart 1961, p. 411 ff.

An important factor to produce the aqueous dispersion of core/shell type particles (a) is the control of the conditions of the polymerization reaction of the mixture of olefinically unsaturated monomers in the presence of the polyurethane resin (P) as core portion. This is performed in the manner of a "starved feed polymerization". A starved feed polymerization in the context of the present invention is regarded as being an emulsion polymerization in which the content of the residual monomers in the reaction solution is minimized over the duration of the reaction. It is thus preferred that the metered addition of the olefinically unsaturated monomers (ii-2) occurs such that a concentration of 6% by weight, preferably 5% by weight, very preferably 4% by weight, based on the total amount of the olefinically unsaturated monomers, in the reaction solution is not exceeded during the entire duration of the polymerizing in step (ii). The concentration of the monomers in the reaction solution can be determined by gas chromatography as described below.

The concentration of monomers in the reaction solution, referred to hereinafter as free monomers, can be controlled in various ways.

One means of keeping the concentration of free monomers low is to choose a very low metering rate of the mixture of olefinically unsaturated monomers. When the rate of metered addition is sufficiently low so that all monomers can react very quickly as soon as they are added to the reaction solution, it is possible to ensure that the concentration of the free monomers is minimized.

As well as the metering rate, it is important that sufficient free radicals are always present in the reaction solution, such that the added monomers can react very rapidly. For this purpose, the reaction conditions should preferably be selected such that the initiator feed is already started before the metered addition of the olefinically unsaturated monomers. Preference is given to starting the initiator feed at least 5 minutes earlier, more preferably at least 10 minutes earlier. Preferably at least 10% by weight, more preferably at least 20% by weight, most preferably at least 30% by weight, of the initiator, based in each case on the total amount of initiator (ii-1), is added before starting the metered addition of the olefinically unsaturated monomers.

The amount of initiator (ii-1) is an important factor for the sufficient presence of free radicals in the reaction solution. The amount of initiator should be selected such that sufficient free radicals are available at any time to allow that the added monomers can react. If the amount of initiator is increased, it is also possible to add larger amounts of monomers at the same time.

A further factor which determines the reaction rate is the structure of the monomers.

The concentration of the free monomers can thus be controlled through the interplay of the amount of initiator, rate of initiator addition, rate of monomer addition, and through the selection of the monomers. The slowing of the metered addition, the increasing of the amount of initiator and the early starting of the initiator feed thus serve the purpose of keeping the concentration of the free monomers below the limits mentioned above.

At any time in the reaction, the concentration of the free monomers can be determined by gas chromatography. Typical parameters for the determination are as follows: 50 m silica capillary column with polyethylene glycol phase or 50 m silica capillary column with polydimethylsiloxane phase, helium carrier gas, split injector 150° C., oven temperature 40 to 220° C., flame ionization detector, detector temperature 275° C., isobutyl acrylate internal standard.

Should any concentration of free monomers which comes close to the limit for the starved feed polymerization be determined in this analysis, for example because of a very low reactivity of the olefinically unsaturated monomers, the abovementioned parameters can be utilized for control of the reaction. In this case, for example, the metering rate of the monomers can be reduced, or the amount of initiator increased.

Suitable olefinically unsaturated monomers may be mono- or polyolefinically unsaturated.

Examples of suitable monoolefinically unsaturated monomers include (meth)acrylate-based monoolefinically unsaturated monomers, vinylic monoolefinically unsaturated monomers, alpha-beta-unsaturated carboxylic acids, and allyl compounds. The term "(meth)acrylate" shall refer hereinafter both to acrylate and to methacrylate.

The (meth)acrylate-based, monoolefinically unsaturated monomers may, for example, be (meth)acrylic acid and esters, nitriles, or amides of (meth)acrylic acid.

Preference is given to esters of (meth)acrylic acid of general formula (I) and/or (II), having an olefinically unsaturated R radical

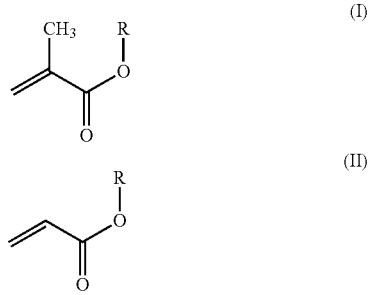

The R radical may be aliphatic or aromatic, preferably aliphatic. The R radical may, for example, be an alkyl radical, or contain heteroatoms. The examples of R radicals containing heteroatoms are ethers. The R radical is preferably an alkyl radical.

If R is an alkyl radical, it may be a linear, branched or cyclic alkyl radical. In all three cases, the alkyl radicals may be unsubstituted alkyl radicals or alkyl radicals substituted by functional groups. The alkyl radical preferably has 1 to 20, more preferably 1 to 10, carbon atoms.

Especially preferentially suitable monounsaturated esters of (meth)acrylic acid having an unsubstituted alkyl radical are methyl(meth)acrylate, ethyl(meth)acrylate, propyl (meth)acrylate, isopropyl(meth)acrylate, n-butyl(meth)acrylate, isobutyl(meth)-acrylate, tert-butyl(meth)acrylate, amyl (meth)acrylate, hexyl(meth)acrylate, ethylhexyl(meth) acrylate, 3,3,5-trimethylhexyl(meth)acrylate, stearyl(meth) acrylate, lauryl(meth)acrylate, cycloalkyl(meth)acrylates such as cyclopentyl(meth)acrylate, isobornyl(meth)acrylate and cyclohexyl(meth)acrylate, very particular preference being given to n- and tert-butyl(meth)acrylate and methyl methacrylate.

Suitable monounsaturated esters of (meth)acrylic acid having a substituted alkyl radical may preferably be substituted by one or more hydroxyl groups.

Especially preferentially suitable monounsaturated esters of (meth)acrylic acid having an alkyl radical substituted by one or more hydroxyl groups are 2-hydroxyethyl(meth)-acrylate, 2-hydroxypropyl(meth)acrylate, 3-hydroxypropyl (meth)acrylate, 3-hydroxy-butyl(meth)acrylate and 4-hydroxybutyl(meth)acrylate.

The vinylic monounsaturated monomers may be monomers of general formula (III) having an olefinically unsaturated R' radical on the vinyl group.

The R' radical may be aliphatic or aromatic, preference being given to aromatic radicals. The R' radical may be a hydrocarbyl radical or contain heteroatoms. Examples of R' radicals containing heteroatoms are ethers, esters, amides, nitriles and heterocycles. The R' radical is preferably a univalent radical derived from hydrocarbon, such as methyl or phenyl.

If R' is a hydrocarbyl radical, it may be substituted by heteroatoms or unsubstituted, preference being given to unsubstituted radicals.

The R' radical is preferably an aromatic hydrocarbyl radical.

Particularly preferred vinylic olefinically unsaturated monomers are vinylaromatic hydrocarbons, especially vinyltoluene, alpha-methylstyrene and especially styrene. When heteroatoms are present, preference is given to olefinically unsaturated monomers such as acrylonitrile, methacrylonitrile, acrylamide, methacrylamide, N,N-dimethylacrylamide, vinyl acetate, vinyl propionate, vinyl chloride, N-vinylpyrrolidone, N-vinylcaprolactam, N-vinylformamide, N-vinylimidazole and N-vinyl-2-methylimidazoline.

Examples of suitable polyolefinically unsaturated monomers include esters of (meth)acrylic acid of general formulas (IV) and/or (V), having an olefinically unsaturated R" radical and allyl ethers of mono- or polyhydric alcohols. The R" radical may be an allyl radical or a (meth)acrylic ester.

Preferred polyolefinically unsaturated monomers include ethylene glycol di(meth)acrylate, 1,2-propylene glycol di(meth)acrylate, 1,3-propylene glycol di(meth)acrylate, butane-1,4-diol di(meth)acrylate, neopentyl glycol di(meth) acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl(meth)acrylate.

In addition, preferred polyolefinically unsaturated compounds include acrylic and methacrylic esters of alcohols having more than 2 OH groups, for example trimethylolpropane tri(meth)acrylate or glyceryl tri(meth)acrylate, but also trimethylolpropane di(meth)acrylate monoallyl ether, trimethylolpropane(meth)acrylate diallyl ether, pentaerythritol tri(meth)acrylate monoallyl ether, pentaerythritol di(meth)acrylate diallyl ether, pentaerythritol(meth)acrylate triallyl ether, triallylsucrose and pentaallylsucrose. Particular preference is given to using allyl methacrylate and/or hexanediol di(meth)acrylate.

The mixture of the olefinically unsaturated monomers comprises at least one polyolefinically unsaturated monomer. The mixture of olefinically unsaturated monomers preferably also comprises one or more monounsaturated esters of (meth)acrylic acid having an unsubstituted alkyl radical.

The mixture of the olefinically unsaturated monomers (ii-3) contains preferably 0.1 to 6.0 mol %, more preferably 0.1 to 2.0 mol %, most preferably 0.1 to 1.0 mol %, of polyolefinically unsaturated monomers, based in each case on the total quantity of olefinically unsaturated monomers.

The mixture of the olefinically unsaturated monomers (ii-3) contains preferably 0.1 to 6.0 mol %, more preferably 0.1 to 2.0 mol %, most preferably 0.1 to 2.0 mol %, of allyl methacrylate and/or hexanediol di(meth)acrylate. More preferably, apart from allyl methacrylate and/or hexanediol di(meth)acrylate, no further polyolefinically unsaturated monomers are present in the mixture, meaning that the mixture contains 0% by weight, based on the total quantity of olefinically unsaturated monomers, of further polyolefinically unsaturates monomers apart from allyl methacrylate.

The mixture of olefinically unsaturated monomers (ii-3) contains preferably <10.0% by weight, more preferably <5.0% by weight, very preferably 0% by weight, of vinylaromatic hydrocarbons, based on the total amount of olefinically unsaturated monomers.

In a preferred embodiment, the mixture of olefinically unsaturated monomers (ii-3) contains—based on the total amount of olefinically unsaturated monomers:

98.0 to 99.5% by weight of one or more monounsaturated esters of (meth)acrylic acid having unsubstituted alkyl radicals, where the alkyl radicals have a length of 1 to 10, preferably 3 to 5, carbon atoms, and 0.5 to 2.0% by weight of one or more polyunsaturated esters of (meth)acrylic acid, preferably allyl (meth) acrylate and/or hexanediol di(meth)acrylate.

Preferably, at least one solvent is added to the mixture of olefinically unsaturated monomers (ii-3), the solvent being miscible in any ratio with water and in any ratio with the mixture of olefinically unsaturated monomers. Particularly suitable solvents are N-methylpyrrolidone, N-ethylpyrrolidone and ether alcohols, such as methoxypropanol.

The aqueous dispersion of core/shell type particles (a) is only obtained via the production process stated above. This core-shell structure is characterized by a core comprising at least one polyurethane resin (P) and a shell comprising a crosslinked acrylic resin (A) which has been obtained by polymerization of olefinically unsaturated monomers in the presence of the polyurethane core.

The core-shell structure is achieved through the specific reaction conditions of the starved feed polymerization and the use of a water-soluble initiator. Over the entire duration of the reaction, no large amounts of olefinically unsaturated monomers which could penetrate into the initially charged polyurethane resin (P) are present. By the constant presence of free radicals during the addition of monomers to the aqueous phase, said free radicals being provided by the water-soluble initiator, oligomers are formed immediately on addition of the monomers. These oligomers can no longer penetrate into the polyurethane core (P) and thus polymerize on the surface of the polyurethane core (P) to give the crosslinked acrylic shell (A).

The glass transition temperature $T_g$ of the polyurethane resin (P) of the core portion and/or the glass transition temperature $T_g$ of the crosslinked acrylic resin (A) of the shell portion is preferably within a specific range. The glass transition temperature $T_g$ of the polyurethane resin (P) of the core portion is preferably from −80° C. to 105° C., more preferably −60 to 80° C., even more preferably 50 to 60° C., and/or the glass transition temperature $T_g$ of the crosslinked acrylic resin (A) of the shell portion is preferably from −80° C. to 20° C., more preferably −60 to 20° C., measured according to DIN EN ISO 11357-2:2013-05. Specific examples of the $T_g$ of the polyurethane core (P) include −75, −70, −65, −60, −55, −50, −45, −40, −35, −30, −25, −20, −15, −10, −5, 0, 5, 10, 15, 20° C. Specific examples of the $T_g$ of the acrylic shell (A) include −55, −50, −45, −40, −35, −30, −25, −20, −15, −10, −5, 0, 5, 10, 15, 20° C. In view of improved hardness and repair adhesion as well as improved stone chipping resistance, it is desirable if the polyurethane core has a lower $T_g$ than the crosslinked acrylic shell.

Apart from the stated glass transition temperature Tg of the core portion and the shell portion, it is also preferable, if the core/shell type particles in the aqueous dispersion (a) have a glass transition temperature of −50 to 30° C., as measured according to DIN EN ISO 11357-2:2013-05.

For the purposes of the invention, the glass transition temperature $T_g$ is determined experimentally according to DIN 51005:2005-08 and DIN EN ISO 11357-2:2013-05. This involves weighing out a 10 mg sample into a sample pan and introducing it into a DSC instrument. The instrument is cooled to the start temperature, after which 1st and 2nd measurement runs are carried out under inert gas flushing ($N_2$) at 50 ml/min, with a heating rate of 10 K/min, with cooling to the start temperature again between the measurement runs. Measurement takes place customarily in the temperature range from about 50° C. lower than the expected glass transition temperature to about 50° C. higher than the glass transition temperature. The glass transition temperature for the purposes of the present invention, in accordance with DIN EN ISO 11357-2:2013-05, is the temperature in the 2nd measurement run at which half of the change in the specific heat capacity (0.5 delta cp) is reached. This temperature is determined from the DSC diagram (plot of the thermal flow against the temperature) and is the temperature at the point of intersection of the midline between the extrapolated baselines, before and after the glass transition, with the measurement plot.

All of the values reported above for glass transition temperatures $T_g$ of the acrylic shell portion relate to the particular polymer which is formed when the respective monomer mixture (ii-3) is polymerized in the absence of the aqueous dispersion of the polyurethane resin (P).

For a purposive estimation of the anticipated glass transition temperatures, the Fox equation can be used:

$$\frac{1}{T_g} = \frac{x_1}{T_{g1}} + \frac{x_2}{T_{g2}} + \ldots + \frac{x_n}{T_{gn}}$$

$T_g$: glass transition temperature of the resulting copolymer (kelvins)

$x_1, x_2, \ldots, x_n$: Weight portion of the monomer component 1, 2, . . . , n $T_{g1}, T_{g2} T_{gn}$: glass transition temperature of the homopolymer of the monomer component 1, 2, . . . , n (kelvins).

Since the Fox equation represents only an approximation, based on the glass transition temperatures of the homopolymers and their weight portions, without including a molecular weight, it can be used as a tool or a purposive indicator to the skilled person in the synthesis. However, the glass transition temperature values relevant for the description of the present invention are those measured as described above.

The polyurethane resin (P) which forms the core portion has a sufficient quantity of the aforementioned hydrophilic groups in order to enable water dispersibility. The acid number of the polyurethane resin (P) of the core portion is therefore preferably 10 to 60 mg KOH/g, very preferably 30 to 40 mg KOH/g, measured according to DIN EN ISO 2114:2002-06. The OH number of the polyurethane resin (P) is preferably 20 to 80 mg KOH/g, measured according to R.-P. Krüger, R. Gnauck and R. Algeier, Plaste und Kautschuk, 20, 274 (1982). If the acid number is lower than 10 mg KOH/g or the OH number is less than 20 mg KOH/g, the emulsion stability of the polyurethane resin (P) in an aqueous medium declines, if the acid value exceeds 60 mg KOH/g or the OH number exceeds 80 mg KOH/g, the water solubility of the polyurethane resin (P) becomes too high. In both cases, discrete core/shell type particles would no longer be obtained from the process previously described. The OH number can be determined based on R.-P. Kruger, R. Gnauck and R. Algeier, Plaste und Kautschuk, 20, 274 (1982), by means of acetic anhydride in the presence of 4-dimethylaminopyridine as a catalyst in a tetrahydrofuran (THF)/dimethylformamide (DMF) solution at room temperature, with full hydrolysis of the remaining excess of acetic anhydride after acetylation and potentiometric back-titration of the acetic acid with alcoholic potassium hydroxide solution. The acid number can be determined based on DIN EN ISO 2114:2002-06 in homogeneous solution of THF/water (9 parts by volume of THF and 1 part by volume of distilled water) with ethanolic potassium hydroxide solution.

With respect to the appearance of the coating film and the adhesion of the coating film on the object to be coated, it is desirable if the crosslinked acrylic resin (A) of the shell portion has an OH number of 10 to 140 mg KOH/g, measured according to R.-P. Krüger, R. Gnauck and R. Algeier, Plaste und Kautschuk, 20, 274 (1982), and an acid number of 0 to 10 mg KOH/g, measured according to DIN EN ISO 2114:2002-06. If the OH number is less than 10 mg KOH/g adhesion to the object to be coated may decline and if the hydroxyl group value exceeds 140 mg KOH/g, the polarity of the shell portion becomes too high, thus increasing the risk of undesirable layer mixing between a first water-based coating material and a second water-based coating material or between a second water-based coating material and a clear coating material in a multilayer coating method. This layer intermixing can lead to a negative influence on the appearance of the multilayer coating. If the acid value of the acrylic resin (A) exceeds 10 mg KOH/g, core/shell type particles might not be obtained in the production process previously described.

Apart from the acid and OH numbers stated above for the core and shell portion, it is also favorable if the core/shell type particles in the aqueous dispersion (a) have a specific acid and OH number. It is therefore preferred if the core/shell type particles in the aqueous dispersion (a) have an acid number of 10 to 30 mg KOH/g solids and/or an OH number of 20 to 50 mg KOH/g solids, determined as previously described.

In a preferred embodiment, the weight ratio of the polyurethane core portion to the crosslinked acrylic shell portion is 80:20 to 20:80, more preferably 60:40 to 40:60. The microstructure of the core/shell type particles can be examined by transmission electron microscopy as described in US 2016/0152862 A1.

The core/shell type particles in the aqueous dispersion (a) preferably have a particle size (z average) of 60 to 250 nm, more preferably of 60 to 115 nm, measured by means of photon correlation spectroscopy with a Malvern Nano S90 (from Malvern Instruments) at 25±1° C. The unit, equipped with a 4 mW He—Ne laser at a wavelength of 633 nm, covers a size range from 1 to 3,000 nm.

Preferably, the acid number of the core/shell type particles in the aqueous dispersion (a) is 0 to 220 mg KOH/g solid resin, more preferably 0 to 40 mg KOH/g solid resin, very preferably 0 to 25 mg KOH/g solid resin. The OH number is preferably less than 70 and more preferably less than 20 mg KOH/g solid resin. The acid number and the OH number are measured as previously described.

The weight-average molar mass of the core/shell type particles in the aqueous dispersion (a) is preferably $3*10^7$ g/mol to $8.5*10^9$ g/mol, more preferably $3*10^7$ g/mol to $5*10^{10}$ g/mol, the weight-average molar mass being determinable by small-angle laser light scattering.

The solids content of the aqueous dispersion (a) is preferably 20 to 45% by weight, very preferably of 25 to 40% by weight, measured according to DIN EN ISO 3251:2008-06. The solids content is understood to mean the proportion by weight which remains as a residue on evaporative concentration under fixed conditions. The solids are determined to DIN EN ISO 3251 at 130° C., 60 min, starting weight 1.0 g.

The core/shell type particles are crosslinked. The gel content of the aqueous dispersion (a) is preferably 40 to 97% by weight, more preferably 75 to 90% by weight, based in each case on the solids in the dispersion. The gel content can be determined gravimetrically, by freeze-drying the dispersion, determining the total mass of the freeze-dried polymer and then extracting the polymer in an excess of tetrahydrofuran (ratio of tetrahydrofuran to freeze-dried polymer=300:1) at 25° C. for 24 hours. The insoluble fraction is removed and dried in an air circulation oven at 50° C. for 4 hours. Thereafter, the dried insoluble fraction is weighed, and the quotient is formed with the total mass of the freeze-dried polymer. The value obtained corresponds to the gel content.

According to a preferred embodiment of the present invention, the aqueous coating composition comprises the at least one aqueous dispersion (a) in a specific mass ratio. Preferably, the aqueous coating composition comprises the at least one aqueous dispersion (a) in a total amount of 0.5 to 50% by weight, more preferably 2 to 40% by weight, very preferably 3 to 30% by weight, based in each case on the total amount of the aqueous coating composition. The use of the aqueous dispersion (a) in the stated amounts leads to good optical properties, more particularly good pinholing behavior and good anti-run stability, as well as good mechanical properties such as the high adhesion and/or stonechip resistance.

Aqueous Polyurethane-Polyurea Dispersion (b):

In addition to the above-mentioned aqueous dispersion (a), the aqueous coating composition of the present invention further contains an aqueous polyurethane-polyurea dispersion (b) comprising polyurethane-polyurea particles. This means that the polymer particles present in the dispersion are polyurethane-polyurea-based.

The polyurethane-polyurea particles present in the aqueous polyurethane-polyurea dispersion (b) possess a gel fraction of at least 50% (for measurement method, see Example section). Thus, the dispersion (b) is a microgel dispersion in which the polyurethane-polyurea polymer is present in the form of comparatively small particles (i.e. microparticles) which are at least partially intramolecularly crosslinked. The latter means that the polymer structure of a particle corresponds to a typical macroscopic network with a three-dimensional network structure. While the particles may be partially crosslinked, the system is nevertheless a dispersion with discrete particles having a measurable average particle size.

The fraction of crosslinking can be determined, for example, after removal of water and any organic solvents and subsequent extraction. The phenomenon utilized here is that the microgel particles originally soluble in suitable organic solvents retain their inner network structure after isolation and behave like a macroscopic network in the solid. Crosslinking may be verified via the experimentally accessible gel fraction. The gel fraction is ultimately the fraction of the polymer from the dispersion that cannot be molecularly dissolved in a solvent. This insoluble fraction corresponds in turn to the fraction of the polymer that is present in the dispersion in the form of intramolecularly crosslinked particles or particle fractions, provided that a further increase in the gel fraction from crosslinking reactions after isolation of the polymeric solid is avoided.

The polyurethane-polyurea particles present in the aqueous polyurethane-polyurea dispersion (b) preferably possess a gel fraction of at least 60%, more preferably of at least 70%, especially preferably of at least 80%. The gel fraction may therefore amount to up to 100% or approximately 100%, as for example 99% or 98%. In such a case, then, the entire—or almost the entire—polyurethane-polyurea polymer is present in the form of crosslinked particles. Specific ranges include 60 to 100%, 70 to 100%, 80 to 100%, 80 to 99%, 80 to 98%, 80 to 95%, 80 to 90% or 85 to 95%.

The polyurethane-polyurea particles present in the dispersion (b) preferably possess an average particle size of 40 to 1,500 nm, more preferably of 50 to 1,000 nm, more preferably 60 to 500 nm, and even more preferably 120 to 300 nm. An especially preferred range is from 70 to 210 nm. The particle sizes are measured by photon correlation spectroscopy (PCS) at 25±1° C. (for measurement method, see Example section).

The polyurethane-polyurea particles present in the dispersion (b) comprise, in each case in reacted form, at least one specific polyurethane prepolymer (PP) and at least one specific polyamine (PA). The term "comprise certain components in reacted form" means that these components are used as starting materials in the preparation of the respective polymer particles. In the preparation of polyurethane-polyurea particles, the components (PP) and (PA) are reacted with one another by reaction of the isocyanate groups of (PP) with the amino groups of (PA), with formation of urea bonds. Since the starting materials remain unchanged apart from the reacted isocyanate groups and amino groups, the particles comprise the two components (PP) and (PA). The meaning of the expression "the polymer comprises, in reacted form, a component (X)" can therefore be equated with the meaning of the expression "in the preparation of the polymer, component (X) was used".

The polyurethane-polyurea particles preferably consist of the two components (PP) and (PA); in other words, they are prepared using only these two components.

The aqueous dispersion (b) can be obtained by a specific three-step process. In a first step (I) of said process, a specific composition (Z) is prepared, which is dispersed in aqueous phase in a second step (II). In step (III) of the process, the at least one organic solvent (OS) is removed at least partly from the dispersion obtained in step (II). In the context of the description of said process, preferred embodiments of components (PP) and (PA) are also mentioned.

The composition (Z) prepared in the first step (I) comprises at least one, preferably precisely one, specific intermediate (I1) which contains isocyanate groups and has blocked primary amino groups.

The preparation of the intermediate (I1) involves the reaction of at least one polyurethane prepolymer (PP), containing isocyanate groups and comprising anionic groups and/or groups which can be converted into anionic groups, with at least one polyamine (PA-a) derived from a polyamine (PA), said polyamine (PA-a) comprising two blocked primary amino groups and one or two free secondary amino groups.

Polyurethane polymers containing isocyanate groups and comprising anionic groups and/or groups which can be converted into anionic groups are known in principle. For the purposes of the present invention, component (PP) is referred to as prepolymer, since it is used as a starting component for preparing another component, specifically the intermediate (I1).

The prepolymers (PP) are prepared by reacting the polyisocyanates with polyols, more particularly diols, generally with formation of urethanes and/or polyamines. Polyisocyanates, polyols and polyamines that can suitably be used to synthesize prepolymer (PP) are described in US 2018/0002476 A1. Preferably, the prepolymer (PP) is prepared by using at least one polyester diol which is a product of a diol and a dicarboxylic acid, and wherein at least 50% by weight of the dicarboxylic acid in preparation of the at least one polyester diol is at least one dimer fatty acid. Dimer fatty acids or dimerized fatty acids are mixtures prepared by dimerizing unsaturated fatty acids and are available, for example, under the commercial names Radiacid (from Oleon) or Pripol (from Croda).

The prepolymers (PP) comprise anionic groups and/or groups which can be converted into anionic groups, for example, carboxylic, sulfonic and/or phosphonic acid groups, preferably carboxylic acid groups, and also anionic groups derived from the aforementioned functional groups, such as, more particularly, carboxylate, sulfonate and/or phosphonate groups, preferably carboxylate groups. The introduction of such groups is known to increase the dispersibility in water. Depending on the amount of neutralizing agent present, the stated groups may be present as free acid groups (for example carboxylic acid) or as salted groups (for example carboxylate). Irrespective of the form in which the stated groups are present, however, a uniform nomenclature is frequently selected in the context of the present invention, for greater ease of comprehension. If there is to be any differentiation in this respect, such differentiation is dealt with, for example, using the degree of neutralization.

To introduce the stated groups, starting materials comprising groups capable of forming urethane bonds, preferably hydroxyl groups, as well as the aforementioned groups, for example carboxylic acid groups, can be used for the preparation of the prepolymers (PP). Suitable starting materials for introducing the preferred carboxylic acid groups are carboxylic acid group containing polyether polyols and/or polyester polyols. However, low molecular weight compounds, preferably monomeric compounds, which have at least one carboxylic acid group and at least one functional group reactive toward isocyanate groups, for example hydroxyl groups, are preferably used in the preparation of the prepolymer (PP). The term "low molecular weight compound" is understood to mean that the corresponding compounds have a molecular weight of less than 300 g/mol. Preference is given to the range from 100 to 200 g/mol.

Compounds preferred in this context are monocarboxylic acids containing two hydroxyl groups, as for example dihydroxypropionic acid, dihydroxysuccinic acid, and dihydroxybenzoic acid. Very particular compounds are α,α-dimethylolalkanoic acids such as 2,2-dimethylolacetic acid, 2,2-dimethylolpropionic acid, 2,2-dimethylolbutyric acid and 2,2-dimethylolpentanoic acid, especially 2,2-dimethylolpropionic acid.

According to a preferred embodiment, the polyurethane prepolymer (PP) comprises carboxylic acid groups. The prepolymer (PP) therefore preferably possesses an acid number, based on the solids content, of 10 to 35 mg KOH/g, more preferably 15 to 23 mg KOH/g, measured according to DIN EN ISO 2114:2002-06.

The number-average molecular weight $M_n$ of the prepolymers (PP) may vary widely and is situated for example in the range from 2,000 to 20,000 g/mol, preferably from 3,500 to 6,000 g/mol, measured with a vapor pressure osmometer 10.00 with benzophenone as calibration substance (see above).

The prepolymer (PP) contains isocyanate groups. Preferably, based on the solids content, it possesses an isocyanate content of 0.5 to 6% by weight, preferably 1 to 5% by weight, especially preferably 1.5 to 4% by weight, measured according to DIN EN ISO 3251:2008-06, DIN EN ISO 11909:2007-05 and DIN EN ISO 14896:2009-07.

Given that the prepolymer (PP) contains isocyanate groups, the hydroxyl number of the prepolymer (PP) is very low. The hydroxyl number of the prepolymer, based on the solids content, is preferably less than 15 mg KOH/g, more preferably less than 10 mg KOH/g, very preferably less than 5 mg KOH/g, measured according to R.-P. Kruger, R. Gnauck and R. Algeier, Plaste and Kautschuk, 20, 274 (1982).

The prepolymers (PP) may be prepared by known and established methods in bulk or solution, preferably by reaction of the starting compounds in organic solvents, such as methyl ethyl ketone, at temperatures of 60 to 120° C., and optionally with use of catalysts typical for polyurethane preparation. Such catalysts are known to those skilled in the art, one example being dibutyltin laurate. The preparation is preferably carried out in an organic solvent (OS) as described later, since this solvent must in any case be present in the composition (Z) prepared in step (I) of the process.

As already indicated above, the anionic groups in the prepolymer (PP) may also be partially salted by using a neutralizing agent. In this way it is possible to adjust the water-dispersibility of the prepolymers (PP) and hence also of the intermediate (I1).

Neutralizing agents include, in particular, the known basic neutralizing agents such as, for example, carbonates, hydrogencarbonates, or hydroxides of alkali metals and alkaline earth metals, such as LiOH, NaOH, KOH, or $Ca(OH)_2$. Likewise suitable for the neutralization and preferred for use in the context of the present invention are organic bases containing nitrogen, such as amines, for example ammonia, trimethylamine, triethylamine, tributylamines, dimethylaniline, triphenylamine, dimethylethanolamine, methyldiethanolamine, triethanolamine and also mixtures thereof.

The neutralization of the prepolymer (PP) with a neutralizing agent, more particularly with a nitrogen-containing organic base, may take place after the preparation of the prepolymer (PP) in organic phase, more particularly a solvent (OS) as described below. The neutralizing agent may of course also be added during or before step (II), in which case the starting compounds containing carboxylic acid groups are neutralized. The prepolymer (PP) is preferably neutralized as described after its preparation and before its use for preparing the intermediate (I1).

If neutralization of the groups which can be converted into anionic groups, more particularly of the carboxylic acid groups, is desired, the neutralizing agent may be added in an amount such that a proportion of 35% to 65% of the groups is neutralized (degree of neutralization). Preference is given to a range from 40% to 60% (for method of calculation, see Example section).

The preparation of the intermediate (I1) described here involves the reaction of the above-described prepolymer (PP) with at least one, preferably precisely one, polyamine (PA-a) derived from a polyamine (PA).

The polyamine (PA-a) comprises two blocked primary amino groups and one or two free secondary amino groups. Blocked amino groups are those in which the hydrogen residues on the nitrogen have been substituted with a blocking agent which can be removed under specific reaction conditions. After blocking, the amino groups cannot react like free amino groups via condensation reactions or addition reactions, and in this respect are therefore nonreactive, thereby differentiating them from free amino groups. The blocked amino groups can only react after the blocking agent has been removed to yield free amino groups. The principle therefore resembles the principle of capped or blocked isocyanates, which are likewise known within the field of polymer chemistry.

The primary amino groups of the polyamine (PA-a) may be blocked with blocking agents that are known per se, for example with ketones and/or aldehydes. Use of these blocking agents yields ketimines and/or aldimines which no longer contain any nitrogen-hydrogen bonds so that typical condensation reactions or addition reactions of the amino group with a further functional group, such as an isocyanate group, are no longer possible.

Reaction conditions for the preparation of a blocked primary amine of this kind, such as of a ketimine are known. Such blocking may be realized with introduction of heat to a mixture of a primary amine with an excess of a ketone which functions at the same time as a solvent for the amine. The water formed during this reaction is preferably removed to prevent that the reverse reaction (deblocking) takes place. The reaction conditions for deblocking of blocked primary amino groups are also known per se. For example, addition of a blocked amine to an aqueous phase is sufficient to shift the equilibrium back to the side of the free amino groups and free ketone because of the concentration pressure exerted by the water.

It follows from the above that in the context of the present invention, a clear distinction is being made between blocked and free amino groups. If, nevertheless, an amino group is neither specified as being blocked nor as being free, this amino group is a free amino group.

Preferred agents for blocking the primary amino groups of the polyamine (PA) are ketones. Particularly preferred among the ketones are those which can also function as an organic solvent (OS) described later. The reason is that these solvents (OS) must be present in any case in the composition (Z) prepared according to step (I) of the process. It has already been indicated above that the preparation of corresponding primary amines blocked with a ketone proceeds to particularly good effect in an excess of the ketone. By using ketones for the blocking and as organic solvent (OS), there is no need for costly and inconvenient removal of the blocking agent, if the presence of this blocking agent is undesirable in later steps of the process. Instead, the solution of the blocked amine can be used directly to prepare the intermediate (I1). Preferred blocking agents and organic solvents (OS) are acetone, methyl ethyl ketone, methyl isobutyl ketone, diisopropyl ketone, cyclopentanone, or cyclohexanone, particularly preferred agents are the ketones methyl ethyl ketone and methyl isobutyl ketone.

The preferred blocking with ketones and/or aldehydes, more particularly ketones, and the accompanying preparation of ketimines and/or aldimines, has the advantage that primary amino groups are blocked selectively. Secondary amino groups present are not blocked and therefore remain free. Consequently, a polyamine (PA-a) which also contains one or two free secondary amino groups apart from two blocked primary amino groups, can be readily prepared from a polyamine (PA) having one or two secondary amino groups and two primary amino groups by using ketones and/or aldehydes as blocking agents.

Ultimately suitable are all aliphatic, aromatic, or araliphatic (mixed aliphatic-aromatic) polyamines (PA) which are known per se and which have two primary amino groups and one or two secondary amino groups. This means that as well as the stated amino groups, there may per se be any aliphatic, aromatic, or araliphatic groups present. Possible, for example, are monovalent groups located as terminal groups on a secondary amino group, or divalent groups located between two amino groups. Aliphatic in the context of the present invention is a residue referring to all organic groups which are not aromatic. For example, the groups present as well as the stated amino groups may be aliphatic hydrocarbon groups, in other words groups which consist exclusively of carbon and hydrogen and which are not aromatic. These aliphatic hydrocarbon groups may be linear, branched, or cyclic, and may be saturated or unsaturated. These groups may of course also include both cyclic and linear or branched moieties. It is also possible for aliphatic groups to contain heteroatoms, more particularly in the form of bridging groups such as ether, ester, amide and/or urethane groups. Possible aromatic groups are likewise known and require no further elucidation.

The polyamines (PA-a) preferably possess two blocked primary amino groups and one or two free secondary amino groups. Preferably, in total, the polyamines (PA-a) possess three or four amino groups, these groups being selected from the group consisting of the blocked primary amino groups and of the free secondary amino groups. Especially preferred polyamines (PA-a) are those which consist of two blocked primary amino groups, one or two free secondary amino groups, and aliphatically saturated hydrocarbon groups. Similar preferred embodiments apply for the polyamines (PA) which consists of one or two secondary amino groups, two primary amino groups and aliphatically saturated hydrocarbon groups.

Examples of preferred polyamines (PA) from which polyamines (PA-a) may be prepared by blocking of the primary amino groups are (a) polyamines (PA) comprising one secondary amino group and two primary amino groups for blocking, such as diethylenetriamine, 3-(2-aminoethyl) aminopropylamine, dipropylene-triamine, N1-(2-(4-(2-aminoethyl)piperazin-1-yl)ethyl)ethane-1,2-diamine, (b) polyamines (PA) comprising two secondary amino groups and two primary amino groups for blocking, such as triethylenetetramine and N,N'-bis(3-aminopropyl)ethylenediamine, and (c) mixtures thereof.

For reasons associated with pure technical synthesis, blocking of primary amino groups of the polyamine (PA) is not always quantitative, meaning that not all available primary amino groups of the polyamine (PA) are fully blocked by the blocking agent. In the context of the present invention, a polyamine (PA-a) has blocked primary amino groups if more than 95 mol % of the primary amino groups present in the quantity of polyamine (PA) employed are blocked (determinable by IR spectroscopy; see Example section), meaning that the major fraction of the total amount of the polyamine (PA) used for blocking does in fact contain exclusively blocked primary amino groups, specifically exactly two blocked primary amino groups.

The preparation of the intermediate (I1) involves the reaction of isocyanate groups of the prepolymer (PP) with free secondary amino groups of the polyamine (PA-a) with the formation of urea bonds without deblocking the primary amino groups. It is therefore readily apparent that no other amines having free or blocked secondary or free or blocked primary amino groups or no reaction conditions that would lead to a deblocking of the primary amino groups are used in the preparation of the intermediate (I1). The intermediate (I1) can be prepared by known and established techniques in bulk or solution, preferably by reaction of (PP) with (PA-a) in organic solvents which are unreactive towards the functional groups of (PP) and (PA-a). As solvent, preference is given to using, at least proportionally, an organic solvent (OS) as described later, especially methyl ethyl ketone, since this solvent must in any case be present in the composition (Z) prepared in step (I) of the process. With preference a solution of a prepolymer (PP) in a solvent (OS) is mixed with a solution of a polyamine (PA-a) in a solvent (OS) to prepare intermediate (I1).

Of course, the intermediate (I1) thus prepared may be neutralized during or after the preparation, using neutralizing agents already described above, in the manner likewise described above for the prepolymer (PP). It is nevertheless preferred for the prepolymer (PP) to be neutralized prior to its use for preparing the intermediate (I1), in a manner described above. In such a case, therefore, the degree of neutralization of the prepolymer (PP) can be equated with the degree of neutralization of the intermediate (I1). Where there is no further addition of neutralizing agents at all in the context of the process, therefore, the degree of neutralization of the polymers present in the ultimately prepared aqueous dispersions (b) can also be equated with the degree of neutralization of the prepolymer (PP).

The intermediate (I1) therefore contains blocked primary amino groups as well as isocyanate groups. Accordingly, in the reaction of (PP) and (PA-a), the ratio of these components must be selected such that the product—that is, the intermediate (I1)—contains isocyanate groups. Since only free secondary amino groups of (PA-a) are reacted with isocyanate groups of (PP), the molar ratio of isocyanate groups from (PP) to the free secondary amino groups of (PA-a) must be higher than 1. The molar amounts (n) of isocyanate groups, free secondary amino groups, and blocked primary amino groups, in this preferred embodiment, satisfy the following condition: [n (isocyanate groups from (PP))–n (free secondary amino groups from (PA-a))]/n (blocked primary amino groups from (PA-a))=1.2/1 to 4/1, preferably 1.5/1 to 3/1, very preferably 1.8/1 to 2.2/1, even more preferably 2/1.

In this preferred embodiment, the intermediate (I1), formed by reaction of isocyanate groups of (PP) with the free secondary amino groups of (PA-a), possesses an excess of isocyanate groups in relation to the blocked primary amino groups. This excess is ultimately achieved by selecting the molar ratio of isocyanate groups of (PP) to the total amount of free secondary amino groups and blocked primary amino groups of (PA-a) to be large enough that even after the preparation of (I1) and the corresponding consumption of isocyanate groups by the reaction with the free secondary amino groups, there remains a corresponding excess of the isocyanate groups. If, for example, the polyamine (PA-a) has one free secondary amino group and two blocked primary amino groups, the molar ratio between the isocyanate groups of (PP) to the polyamine (PA-a) in a especially preferred embodiment is set at 5/1. The consumption of one isocyanate group in the reaction with the free secondary amino group would then mean that 4/2 (or 2/1) was realized for the condition stated above.

The fraction of the intermediate (I1) is from 15 to 65% by weight, preferably from 25 to 60% by weight, more preferably from 30 to 55% by weight, very preferably from 35 to 52.5% by weight, and, in one very particular embodiment, from 40 to 50% by weight, based in each case on the total amount of the composition (Z). The fraction of the intermediate (I1) corresponds to the solids content of the composition (Z) because this composition does only contain the intermediate (I1) and organic solvents (see Example section for determination of solids content)

The composition (Z) further comprises at least one specific organic solvent (OS).

The solvents (OS) possess a solubility in water of not more than 38% by weight at a temperature of 20° C. (for measurement method, see Example section). The solubility in water at a temperature of 20° C. is preferably less than 30% by weight. A preferred range is from 1 to 30% by weight. The solvent (OS) accordingly possesses a fairly moderate solubility in water, being in particular not fully miscible with water or possessing no infinite solubility in water. A solvent is fully miscible with water when it can be mixed in any proportions with water without occurrence of separation Examples of solvents (OS) are methyl ethyl ketone, methyl isobutyl ketone, diisobutyl ketone, diethyl ether, dibutyl ether, dipropylene glycol dimethyl ether, ethylene glycol diethyl ether, toluene, methyl acetate, ethyl acetate, butyl acetate, propylene carbonate, cyclohexanone, or mixtures of these solvents. Preference is given to methyl ethyl ketone, which has a solubility in water of 24% by weight at 20° C. In contrast, acetone, N-methyl-2-pyrrolidone, N-ethyl-2-pyrrolidone, tetrahydrofuran, dioxane, N-formylmorpholine, dimethylformamide, or dimethyl sulfoxide do not possess the claimed water solubility and are therefore not suitable as solvents (OS).

A particular effect of selecting the specific solvents (OS) of only limited solubility in water is that when the composition (Z) is dispersed in aqueous phase in step (II) of the process, no homogeneous solution is formed. It is assumed that the dispersion that is present allows crosslinking reactions (addition reactions of free primary amino groups and isocyanate groups of intermediate (I1)) in step (II) to take place in a restricted volume, thereby ultimately resulting in the formation of the microparticles defined as above.

Apart from the water-solubility described above, preferred solvents (OS) possess a boiling point of not more than 120° C., more preferably of not more than 90° C. (at 1.013 bar). This has the advantage that in step (III) of the process, the at least one organic solvent (OS) can be at least partially removed by distillation from the dispersion prepared in step (II), without the simultaneous removal of significant quantities of the water introduced in step (II) of the process. There is therefore no need for the laborious re-addition of water to retain the aqueous nature of the dispersion (b).

The fraction of the at least one organic solvent (OS) is from 35 to 85% by weight, preferably from 40 to 75% by weight, more preferably from 45 to 70% by weight, especially preferably from 47.5 to 65% by weight, and, in one very particular embodiment, from 50 to 60% by weight, based in each case on the total amount of the composition (Z).

By combination of a specific amount of intermediate (I1) and selection of specific solvents (OS) in the composition (Z), it is possible to provide polyurethane-polyurea dispersions which comprise polyurethane-polyurea particles having the claimed particle size and gel fraction.

The components (I1) and (OS) described preferably make up in total at least 90% by weight of the composition (Z). Preferably the two components make up at least 95% by weight, more particularly at least 97.5% by weight, of the composition (Z). With very particular preference, the composition (Z) consists of these two components. In this context it should be noted that where neutralizing agents as described above are used, these neutralizing agents are ascribed to the intermediate when calculating the amount of an intermediate (I1).

Where the composition (Z) includes other components, in addition to components (I1) and (OS), these other components are preferably just organic solvents. The solids content of the composition (Z) therefore corresponds preferably to the fraction of the intermediate (I1) in the composition (Z). The composition (Z) therefore possesses preferably a solids content of 15 to 65% by weight, preferably of 25 to 60% by weight, more preferably of 30 to 55% by weight, very preferably of 35 to 52.5% by weight, and, in one especially preferred embodiment, of 40 to 50% by weight, based on the total amount of composition (Z). A particularly preferred composition (Z) therefore contains in total at least 90% by weight of components (I1) and (OS), and other than the intermediate (I1) includes exclusively organic solvents.

An advantage of the composition (Z) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Preferably, accordingly, the composition (Z) contains less than 10% by weight, preferably less than 5% by weight, more preferably less than 2.5% by weight, very preferably 0% by weight, of organic solvents selected from the group consisting of N-methyl-2-pyrrolidone, dimethylformamide, dioxane, tetrahydrofuran, and N-ethyl-2-pyrrolidone.

In the second step (II) of the process, the composition (Z) is dispersed in aqueous phase. This dispersion results in the deblocking of the blocked primary amino groups of the intermediate (I1) to form free primary amino groups. The resulting free primary amino groups are then reacted with isocyanate groups also present in the intermediate (I1) by addition reaction with formation of urea bonds. Besides the aforementioned reaction of isocyanate groups with unblocked primary amino groups, these isocyanate groups of the intermediate (I1) can also react with water with elimination of carbon dioxide to form free primary amino groups, which can then be reacted with isocyanate groups still present. These reactions and conversions referred to above proceed in parallel with one another. As a result of intermolecular and intramolecular reactions or crosslinking, a dispersion is formed which comprises polyurethane-polyurea particles with defined average particle size and degree of crosslinking or gel fraction.

With preference, the composition (Z), which has for example a temperature of 20 to 25° C. or an elevated temperature of 30 to 60° C. after preparation is stirred into the aqueous phase to produce a dispersion. Preferably, the aqueous phase has room temperature. Dispersion may take place in pure water (deionized water), meaning that the aqueous phase preferably consists solely of water. Besides water the aqueous phase may also include typical auxiliaries such as emulsifiers and protective colloids. A compilation of suitable emulsifiers and protective colloids is found in, for example, Houben Weyl, Methoden der organischen Chemie, volume XIV/1 Makromolekulare Stoffe, Georg Thieme Verlag, Stuttgart 1961, p. 411 ff.

It is of advantage if in step (II) of the process, the weight ratio of organic solvents and water is selected such that the resulting dispersion has a weight ratio of water to organic solvents of greater than 1, preferably of 1.05 to 2/1, especially preferably of 1.1 to 1.5/1.

In step (III) of the process, the at least one organic solvent (OS) is removed at least partly from the dispersion obtained in step (II). Of course, step (III) of the process may also entail removal of other solvents as well, for example in the composition (Z). The removal of the at least one organic solvent (OS) and of any further organic solvents may be accomplished in any way which is known, for example by vacuum distillation at temperatures slightly raised relative to room temperature, for example of 30 to 60° C. The resulting polyurethane-polyurea dispersion (b) is therefore aqueous (regarding the basic definition of "aqueous", see earlier on above).

Based on the solids content, the polyurethane-polyurea particles present in the dispersion (b) preferably possess an acid number of 10 to 35 mg KOH/g, more particularly of 15 to 23 mg KOH/g, measured according to DIN EN ISO 2114:2002-06.

The polyurethane-polyurea particles present in the dispersion (b) preferably possess hardly any or no hydroxyl groups. The OH number of the particles, based on the solids content, is preferably less than 15 mg KOH/g, more particularly less than 10 mg KOH/g, very preferably still less than 5 mg KOH/g, measured according to R.-P. Kruger, R. Gnauck and R. Algeier, Plaste and Kautschuk, 20, 274 (1982).

The fraction of the polyurethane-polyurea particles in the dispersion (b) is preferably 25 to 55% by weight, preferably 30 to 50% by weight, more preferably 35 to 45% by weight, based in each case on the total amount of the dispersion (determined via the solids content).

The fraction of water in the dispersion (b) is preferably 45 to 75% by weight, preferably 50 to 70% by weight, more preferably 55 to 65% by weight, based in each case on the total amount of the dispersion.

It is essential that the dispersion (b) consists to an extent of at least 90% by weight, preferably at least 92.5% by weight, very preferably at least 95% by weight, and more preferably at least 97.5% by weight, of the polyurethane-polyurea particles and water (the associated figure is obtained by adding up the amount of the particles (that is, of the polymer, determined via the solids content) and the amount of water). In spite of this low fraction of further components, such as organic solvents in particular, dispersions (b) are very storage stable.

It is even more preferred that the dispersion (b), other than the polymer, includes only water and organic solvents, for example residual fractions not fully removed in step (III) of the process. The solids content of the dispersion (PD) is therefore preferably 25 to 55% by weight, preferably 30 to 50% by weight, more preferably 35 to 45% by weight, and more preferably still is in equal to the fraction of the particles in the dispersion, based on the total amount of the dispersion (b).

An advantage of the dispersion (b) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly, the dispersion (b) contains preferably less than 7.5% by weight, preferably less than 5% by weight, more preferably less than 2.5% by weight, very preferably 0% by weight, of organic solvents selected from the group consisting of N-methyl-2-pyrrolidone, dimethylformamide, dioxane, tetrahydrofuran, and N-ethyl-2-pyrrolidone.

According to a preferred embodiment of the present invention, the aqueous coating composition comprises the at least one aqueous dispersion (b) in specific amounts. Preferably, the aqueous coating composition comprises the at least one aqueous dispersion (b) in a total amount of 10 to 55% by weight, more preferably 15 to 45% by weight, very preferably 20 to 35% by weight, based in each case on the total amount of the aqueous coating composition. The use of the aqueous dispersion (b) in the stated amounts leads to good optical properties, more particularly good pinholing behavior and good anti-run stability, as well as good mechanical properties, such as high adhesion and/or stonechip resistance.

It is furthermore preferred if the aqueous coating composition comprises the at least one aqueous dispersion of core/shell type particles (a) and the at least one aqueous polyurethane-polyurea dispersion (b) in a specific weight ratio. Therefore, the aqueous coating composition preferably comprises a weight ratio of the at least one aqueous dispersion of core/shell type particles (a) to the at least one aqueous polyurethane-polyurea dispersion (b) of 2:1 to 1:15, very preferably from 1:1.2 to 1:10, based in each case on the solid content of the dispersions. The use of this weight ratio of dispersions (a) and (b) leads to good optical and mechanical properties but also results in a high storage stability of the aqueous coating compositions.

The solids content of the aqueous coating composition of the invention may vary according to the requirements of the case in hand. The solids content is guided primarily by the viscosity that is needed for application, more particularly spray application. A particular advantage is that the aqueous coating composition of the invention, despite having a comparatively high solids content, possess a viscosity which allows appropriate application. The solids content of the aqueous coating composition of the invention—based on the total amount of the coating composition—is preferably 5 to 80% by weight, more preferably 10 to 75% by weight, very preferably 15 to 65% by weight, measured according to DIN EN ISO 3251:2008-06.

At the stated solids contents, preferred aqueous coating composition of the invention have a viscosity of 40 to 150 mPa*s, more particularly 70 to 85 mPa*s, at 23° C. at a shear rate of 1000 1/s (for further details regarding the measurement method, see Example section). For the purposes of the present invention, a viscosity within this range under the stated shear rate is referred to as spray viscosity (working viscosity). As is known, coating materials are applied at spray viscosity, meaning that under the conditions then present (high shearing load) they possess a viscosity to permit effective application. This means that the setting of the spray viscosity is important to allow the aqueous coating composition to be applied by spray methods, and to ensure that a complete, uniform coating film can form on the substrate to be coated. A particular advantage is that even an aqueous coating composition of the invention adjusted to spray viscosity has a high solids content.

Further Components of the Aqueous Coating Composition:

The aqueous coating composition of the present invention can contain further components apart from the stated dispersions (a) and (b).

The aqueous coating composition of the invention preferably further comprises at least one typical crosslinking agent known. It preferably comprises, as a crosslinking agent, polycarboddimides, aminoplast resins, polyisocyanates, blocked polyisocyanates and mixtures thereof, especially polycarbodiimides. Hydrophilic carbodiimides are preferred as polycarbodiimides. Examples of hydrophilic polycarbodiimides include compounds obtained by reacting a polycarbodiimide compound having at least two isocyanate groups per molecule with a polyol having a hydroxyl group at a molecular terminal at such proportions that the NCO/OH molar ratio is greater than 1 and then the obtained reaction product is reacted with a hydrophilizing agent having an active hydrogen atom and a hydrophilic moiety.

In cases where a polycarbodiimide compound is used as a curing agent in the present invention, the NCN/COOH molar ratio in the water-based coating composition is preferably 0.5 to 2, and more preferably 0.8 to 1.5. These ratios result in a good film appearance and adhesion to the substrate to be coated or underlaying film layers.

In this regard, the proportion of the crosslinking agents, more particularly polycarbodiimides, is preferably in the range from 0.5 to 20% by weight, more preferably 3 to 15% by weight, very preferably 6 to 11% by weight, based in each case on the total weight of the aqueous coating composition of the invention.

The stated crosslinker is preferably present if the aqueous coating composition of the invention is used as a first basecoat coating composition (also called CP1 composition) in a 3C1B process to produce a multilayer coating.

If the aqueous coating composition of the invention is used as a second basecoat composition (also called CP2 composition) in a 3C1B process to produce a multilayer coating, the aqueous coating composition preferably does not contain a crosslinker, meaning that this composition comprises a crosslinking agent in a total amount of 0% by weight, based on the total amount of the aqueous coating composition.

The aqueous coating composition of the invention preferably further comprises curable binders which are different from the dispersions (a) and (b) stated above. A "binder" in the context of the present invention and in accordance with DIN EN ISO 4618 is the nonvolatile component of a coating composition, without pigments and fillers. Hereinafter, however, the expression is used principally in relation to particular physically curable polymers which optionally may also be thermally curable, examples being polyurethanes, polyesters, polyacrylates and/or copolymers of the stated polymers. A copolymer in the context of the present invention refers to polymer particles formed from different polymers. This explicitly includes both polymers bonded covalently to one another and those in which the different polymers are bound to one another by adhesion. Combinations of the two types of bonding are also covered by this definition.

In the context of the present invention, the term "physical curing" means the formation of a film through evaporation of solvents from polymer solutions or polymer dispersions. Typically, no crosslinking agents are necessary for this curing.

In the context of the present invention, the term "thermal curing" denotes the heat-initiated crosslinking of a coating film, using either self-crosslinking binders or a separate crosslinking agent in combination with a binder (external crosslinking). The crosslinking agent comprises reactive functional groups which are complementary to the reactive functional groups present in the binders so that a macroscopically crosslinked coating film is formed upon reaction of binders and crosslinker.

The binder components present in the inventive coating composition always exhibit at least a proportion of physical curing. If, therefore, it is said that the coating composition comprises binder components which are thermally curable, this of course does not rule out the curing also including a proportion of physical curing.

The aqueous coating composition of the invention preferably further comprises at least one binder that is different from the polymers present in the dispersions (a) and (b), more particularly at least one binder selected from the group consisting of polyurethanes, polyesters, polyacrylates, copolymers of these polymers and mixtures of these polymers, more particularly polyacrylates and/or polyurethane polyacrylates. Preferred polyesters are described, for example, in DE 4009858 A1 in column 6 line 53 to column 7 line 61 and column 10 line 24 to column 13 line 3. Preferred polyurethane-polyacrylate copolymers (acrylated polyurethanes) and their preparation are described in, for example, in WO 91/15528 A1, page 3, line 21 to page 20, line 33, DE 4437535 A1, page 2, line 27 to page 6, line 22 and EP 0 649 865 A1. Preferred polyacrylates can for example be obtained by radical emulsion polymerisation of at least 50% by weight methyl methacrylate, at least 10% by weight butylacrylate and 5% by weight or less, based in each case on the total amount of monomers, of a mixture of butyl methacrylate, hydroxyethyl methyacrylate, ethylene glycol di(meth) acrylate and methacrylic acid. The binders may be hydroxyfunctional and preferably possess an OH number in the range from 20 to 200 mg KOH/g, more preferably from 40 to 150 mg KOH/g. The aqueous coating composition of the invention more preferably comprise at least one hydroxyfunctional polyurethane-polyacrylate copolymer, at least one hydroxy-functional polyacrylate and at least one acid-functional polyurethane-polyacrylate copolymer.

The proportion of the further polymers as binders—based in each case on binder solids—may vary widely and is situated preferably in the range from 0.5 to 40% by weight, more preferably 1 to 30% by weight, very preferably 1.5 to 20% by weight, based in each case on the total weight of the aqueous coating composition of the invention.

The aqueous coating compositions of the invention are preferably pigmented aqueous coating compositions. It is therefore preferred, if the coating compositions further comprise at least one pigment, selected from the group consisting of color pigments, effect pigments and mixtures thereof. Such color pigments and effect pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable, just like the terms "visual effect pigment" and "effect pigment".

Useful effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as platelet-shaped graphite, platelet-shaped iron oxide, multilayer effect pigments composed of PVD films and/or liquid crystal polymer pigments. Particularly preferred are platelet-shaped metal effect pigments, more particularly plated-shaped aluminum pigments.

Typical color pigments include inorganic color pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate and mixtures of these pigments. Moreover, typical color pigments also include organic color pigments such as monoazo pigments; diazo pigments, anthrachinone pigments, chinacridon pigments, chinophthalon pigments, diketopyrrolopyrrole pigments, dioxazine pigments, indanthrone pigments, isoindolinone pigments, metal complex pigments, perinone pigments, perylene pigments, phthalocyanine pigments, aniline black azomethine pigments and mixtures thereof.

The fraction of the at least one pigment is preferably present in a total amount 1 to 30% by weight, more preferably 1.5 to 20% by weight, very preferably 2 to 15% by weight, based in each case on the total weight of the aqueous coating composition.

Preferably, the coating composition of the invention additionally comprises at least one thickener, selected from the group consisting of phyllosilicates, (meth)acrylic acid-(meth)acrylate copolymers, hydrophobic polyurethanes, ethoxylated polyurethanes, polyamides and their mixtures.

Suitable thickeners are inorganic thickeners from the group of phyllosilicates such as lithium aluminum magnesium silicates. It is nevertheless known that coating compositions whose profile of rheological properties is determined via the primary or predominant use of such inorganic thickeners can be formulated only with decidedly low solids contents, for example of less than 20%, without a negative influence on important performance properties. A particular advantage of the aqueous coating composition of the invention is that it can be formulated without, or without a great fraction of, such inorganic phyllosilicates employed as thickeners. Accordingly, the fraction of inorganic phyllosilicates used as thickeners, based on the total weight of the aqueous coating composition, is preferably less than 0.5% by weight, more preferably less than 0.25% by weight, and very preferably less than 0.05% by weight. With very particular preference, the aqueous coating composition contains 0% by weight of such inorganic phyllosilicate thickeners, meaning that it is entirely free of such thickeners.

Instead, the aqueous coating composition preferably comprises at least one organic thickener, for example a (meth) acrylic acid-(meth)acrylate copolymer thickener, a polyurethane thickener or a polyamide thickener. Employed with preference are associative thickeners, such as associative polyurethane thickeners. Associative thickeners are water-soluble polymers which have strongly hydrophobic groups at the chain ends or in side chains, and/or whose hydrophilic chains contain hydrophobic blocks or monomers in their backbone. As a result, these polymers possess a surfactant character and can form micelles in an aqueous phase. Similar to surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Thickeners of this kind are available commercially, for example under the trade name Adekanol (from Adeka Corporation). Polyamide thickeners are available commercially under the trade name Disparlon (from Kusumoto Chemicals Ltd).

The proportion of the at least one thickener is preferably present in a total amount 0.01 to 2% by weight, more preferably 0.05 to 1% by weight, very preferably 0.1 to 0.6% by weight, based in each case on the total weight of the aqueous coating composition.

Furthermore, the aqueous coating composition of the invention may further comprise at least one adjuvant. Examples of such adjuvants are salts which are thermally decomposable without residue or substantially without residue, polymers as binders that are curable physically, thermally and/or with actinic radiation and that are different from the polymers already stated as binders, further crosslinking agents, organic solvents, acids or bases, reactive diluents, transparent pigments, fillers, molecularly dispersively soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Such adjuvants are used in the customary and known amounts.

Inventive Method:

The inventive aqueous coating compositions can be used as basecoat compositions to prepare multilayer coatings in a 3C1B process.

In the process of the invention, a multilayer coating is built up on a substrate (S) by the following steps:
(1) coating a first aqueous coating material (X) directly on the substrate (S) to form an uncured first coating film (x),
(2) coating a second aqueous coating material (Y) directly on the uncured first coating film obtained after step (1) to form an uncured second coating film (y),
(3) coating a clear coating material (Z) directly on the uncured second coating film obtained after step (2) to form a clear coating film (z), and then
(4) simultaneously curing these three coating films obtained after steps (1) to (3),
wherein the first aqueous coating material (X) and/or the second aqueous coating material (Y) is selected from the inventive aqueous coating composition described previously.

The substrate (S) is preferably selected from metallic substrates, metallic substrates coated with a cured electrocoat, plastic substrates and substrates comprising metallic and plastic components, especially preferably from metallic substrates coated with a cured electrocoat.

In this respect, preferred metallic substrates (S) are selected from iron, aluminum, copper, zinc, magnesium and alloys thereof as well as steel. Preferred substrates are those of iron and steel, examples being iron and steel substrates as used in the automobile industry sector. The substrates themselves may be of any shape—that is, for example simple metal panels or complex components such as automobile bodies and parts thereof.

Preferred plastic substrates (S) are basically substrates comprising or consisting of (i) polar plastics, such as polycarbonate, polyamide, polystyrene, styrene copolymers, polyesters, polyphenylene oxides and blends of these plastics, (ii) synthetic resins such as polyurethane RIM, SMC, BMC and (iii) polyolefine substrates of the polyethylene and polypropylene type with a high rubber content, such as PP-EPDM, and surface-activated polyolefin substrates. The plastics may furthermore be fiber-reinforced, in particular using carbon and/or metal fibers.

Preferred substrates are metallic substrates that are coated by electrophoretic application of an electrocoat material to the substrates and subsequent curing of the electrocoat material to produce a cured electrocoat on the metallic substrates. Suitable electrocoat materials and their curing are described for example in WO 2017/088988 A1. The film thickness of the cured electrocoat is, for example, 10 to 40 micrometers, preferably 15 to 25 micrometers.

The substrates (S) may be pretreated before step (1) of the inventive process or before applying the electrocoat material in any conventional way—that is cleaned and/or provided with known conversion coatings. Cleaning may be accomplished mechanically, for example, by means of wiping, sanding and/or polishing, and/or chemically by means of pickling methods, by incipient etching in acid or alkali baths, by means of hydrochloric or sulfuric acid, for example. Cleaning with organic solvents or aqueous cleaners is of course also possible. Pretreatment may likewise take place by application of conversion coatings, more particularly by means of phosphating and/or chromating, preferably phosphating. In any case, the metallic substrates are preferably conversion-coated, more particularly phosphatized, preferably provided with a zinc phosphate coat.

Step (1):

In step (1) of the process of the invention, an uncured first coating film (x) is produced by application of a first aqueous coating material (X) directly to the substrate (S). The first aqueous coating material (X) can be applied by electrostatic spray application (ESTA). Direct application of the coating material (X) on the substrate (S) results in direct contact of the coating film (x) and the substrate (S). Thus, there is no other coat disposed between coating film (x) and substrate (S).

In a preferred embodiment, no preliminary drying or curing is performed after application of the first aqueous coating material (X) in step (1) of the inventive process. Instead, the first aqueous coating material (X) applied directly on the substrate (S) is preferably flashed off before applying the second aqueous coating material (Y) in step (2).

"Flashing" or "flash off" is understood as passive or active evaporation of organic solvents and/or water from the coating material (X) preferably at 15 to 35° C. for a duration of 0.5 to 30 minutes. After the flashing phase the coating film (x) therefore comprises less water and/or solvent in comparison with the applied coating material (X) but is not yet in the service-ready state. While it is no longer flowable it is still soft and/or tacky and is only partly dried. In particular, the coating film (x) is not yet cured as described later on below.

In contrast, preliminary drying is understood as passive or active evaporation of organic solvents and/or water from a coating material (X) at a higher temperature than used for flashing, for example at 40 to 90° C. for a duration of 1 to 60 minutes. During preliminary drying, the applied coating material (X) will also lose a fraction of organic solvents and/or water. Thus, compared to flashing, preliminary drying proceeds at higher temperatures meaning that there is also a higher fraction of organic solvents and/or water escaping from the applied coating material (X). However, also preliminary drying does not result in a coating film in the service-ready state, i.e. not a cured coating film as described later.

The curing of a coating film is understood accordingly to be the conversion of such a film into the service-ready state, i.e. a state in which the substrate furnished with the coating film in question can be transported, stored, and used in its intended manner. A cured coating film is therefore no longer soft or tacky but instead is conditioned as a solid coating film which, even on further exposure to curing conditions as described later on, no longer exhibits any substantial change in its properties such as hardness or adhesion to the substrate.

The first aqueous coating material (X) is applied such that the first coating film (x) has preferably a film thickness of 5 to 35 μm, preferably 10 to 30 μm. All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

In an especially preferred embodiment of the inventive process, an inventive coating composition as previously described is used as first aqueous coating composition (X).

To obtain good optical properties, more particularly good pinholing behavior and good anti-run stability, as well as good mechanical properties, it is advantageous to use a first aqueous coating composition (X) comprising a specific weight ratio of the aqueous dispersion of core/shell type particles (a) to the aqueous polyurethane-polyurea dispersion (b). It is therefore preferred if the weight ratio of the at least one aqueous dispersion of core/shell type particles (a) to the at least one aqueous polyurethane-polyurea dispersion (b) in the first aqueous coating material (X) is from 10:1 to 1:30, preferably from 1:1.6 to 1:10, based in each case on the solid content of the dispersions.

Use of a first aqueous coating material (X) preferably comprising the at least one aqueous dispersion (a) in a total amount of 0.5 to 40% by weight, more preferably 2 to 30% by weight, very preferably 3 to 25% by weight, based in each case on the total amount of the coating material (X), in step (1) of the inventive process has also proven advantageous with regard to excellent mechanical behavior and hardness of the obtained multilayer coating.

It is furthermore preferred, if the first aqueous coating material (X) comprises at least one crosslinking agent as previously described, very preferably in the amounts as previously described.

Step (2):

In step (2) of the process of the invention, an uncured second coating film (y) is produced by application of a second aqueous coating material (Y) directly to the uncured first coating film (x). The second aqueous coating material (Y) can also be applied by electrostatic spray application (ESTA). Direct application of the coating material (Y) on the uncured first coating film (x) results in direct contact of the coating film (y) and the coating film (x). Thus, there is no other coat disposed between coating films (x) and (y).

According to a preferred embodiment, the second aqueous coating material (Y) is subjected to preliminary heating after application, preferably at 40 to 90° C. for 5 to 60 minutes.

The second aqueous coating material (Y) is applied such that the second coating film (y), after the curing has taken place in step (4), preferably has a film thickness of 5 to 35 μm, more preferably 10 to 30 μm.

In an especially preferred embodiment of the inventive process, an inventive coating composition as previously described is used as second aqueous coating composition (Y). Very preferably, the previously described inventive coating compositions are used in step (1) and step (2) of the inventive process. However, this does not necessarily mean that an identical aqueous coating composition is used in the first and the second step of the inventive process. This merely means that the coating compositions (X) and (Y) used in steps (1) and (2) of the inventive process each comprise at least the stated essential components (a) and (b) but can differ with regard to optional components present in the compositions (X) and (Y).

In a further preferred embodiment, the second aqueous coating composition (Y) also comprises a specific weight ratio of the aqueous dispersion of core/shell type particles (a) and aqueous polyurethane-polyurea dispersion (b). This weight ratio is especially preferably less than the weight ratio of these two components in the aqueous coating composition (X). The weight ratio of the at least one aqueous dispersion of core/shell type particles (a) to the at least one aqueous polyurethane-polyurea dispersion (b) in the second aqueous coating material (Y) is therefore preferably from 2:1 to 1:10, very preferably from 1:1.2 to 1:5, based in each case on the solid content of the dispersions. The stated weight ratios lead to a high flexibility of the coating material (Y) and therefore result in an increased chipping resistance.

Use of coating compositions comprising different weight ratios of the components (a) and (b) in step (1) and (2) of the inventive process results in excellent optical as well as mechanical behavior, especially if the curing in step (4) of the inventive process is performed at temperatures below 100° C.

The second aqueous coating material (Y) preferably comprises the at least one aqueous dispersion (a) in a total amount of 1 to 45% by weight, more preferably 5 to 35% by weight, very preferably 10 of 25% by weight, based in each case on the total amount of the coating material (Y).

Use of coating compositions comprising different amounts of the component (a) in steps (1) and (2) of the inventive process results in excellent optical as well as mechanical behavior, especially if the curing in step (4) of the inventive process is performed at temperatures below 100° C.

While it is preferred that the aqueous coating composition (X) contains at least one crosslinker, the aqueous coating composition (Y) preferably does not comprise at least one crosslinking agent, i.e. the crosslinking agent is present in a total amount of 0% by weight, based on the total amount of the coating material (Y). Even though the second aqueous coating material is not chemically crosslinked, the multilayer coating obtained by the inventive possesses an excellent hardness.

Step (3):

In step (3) of the process of the invention, a clearcoat film (z) is produced directly on the uncured coating second coating film (y). This production is accomplished by corresponding application of a clearcoat material (Z). Direct application of the clear coat material (Z) on the uncured second coating film (y) results in direct contact of the coating film (y) and the clear coating film (z). Thus, there is no other coat disposed between coating films (y) and (z).

The clearcoat material (Z) may be any desired transparent coating material known to the skilled person. "Transparent" means that a film formed with the coating material is not opaquely colored, but instead has a constitution such that the color of the underlying basecoat system is visible. As is known, however, this does not rule out the possible inclusion of pigments in a clearcoat material, such pigments possibly supporting the depth of color of the overall system, for example.

The clearcoat materials (Z) in question are aqueous or solvent-containing transparent coating materials, which may be formulated not only as one-component but also as two-component or multicomponent coating materials. Also suitable are powder slurry clearcoat materials. Solventborne clearcoat materials are preferred.

The clearcoat materials (Z) used may in particular be thermochemically curable and/or actinic-chemically curable. In particular they are thermochemically curable and externally crosslinking. Preference is given to thermochemically curable two-component clearcoat materials.

Typically and preferably, therefore, the clearcoat materials comprise at least one (first) polymer as binder, having functional groups, and at least one crosslinker having a functionality complementary to the functional groups of the binder. With preference at least one hydroxy-functional poly(meth)acrylate polymer is used as binder, and a free and/or blocked polyisocyanate as crosslinking agent.

Suitable clearcoat materials are described in, for example, WO 2006/042585 A1, WO 2009/077182 A1 and WO 2008/074490 A1.

The clearcoat material (Z) is applied by methods known to the skilled person for applying liquid coating materials, for example by dipping, knifecoating, spraying, rolling, or the like. Preference is given to employing spray application methods, such as compressed air spraying (pneumatic application) and electrostatic spray application (ESTA).

The clearcoat material (Z) or the corresponding clearcoat film (z) is subjected to flashing and/or interim-drying after application, preferably at 15 to 35° C. for a duration of 0.5 to 30 minutes. These flashing and interim-drying conditions apply in particular to the preferred case where the clearcoat material (Z) comprises a thermochemically curable two-component coating material. But this does not rule out the clearcoat material (Z) being an otherwise-curable coating material and/or other flashing and/or interim-drying conditions being used.

The clearcoat material (Z) is applied in such a way that the clearcoat film after the curing has taken place in step (4) has a film thickness of, for example, 15 to 80 µm, preferably 20 to 65 µm, very preferably 25 to 60 µm.

The process of the invention does not exclude the presence of further coating materials, as for example further clearcoat materials being applied after the application of the clearcoat material (Z) and further clearcoat films being produced this way. Such further coating films are then likewise cured in step (4) described below. Preferably, however, only one clearcoat material (Z) is applied and then cured as described in step (4).

Step (4):

In step (4) of the process of the invention joint curing of the uncured first coating film (x), the uncured second coating film (y) and of the clearcoat film (z) is performed.

The joint curing preferably takes place at temperatures of 60 to 90° C., more preferably 85° C., for a period of 5 to 60 min, very preferably 15 to 25 min. Since the aqueous coating materials (X) and (Y) are thermochemically curable one-component coating materials, these conditions are generally required to achieve curing as described. Where the clearcoat material (Z), for example, is likewise a thermochemically curable one-component coating material, the corresponding clearcoat film (z) is of course likewise cured under these conditions. The same is true for the preferred case wherein the clearcoat material (Z) is a thermochemically curable two-component coating material.

The statements made above, however, do not rule out that the aqueous coating materials (X) and (Y) as well as clearcoat material (Z) can additionally be cured under further curing conditions.

The process of the invention allows to produce multilayer coatings on substrates without a separate curing step. Nevertheless, application of the process of the invention results in multilayer coatings which exhibit excellent stability toward pinholes, meaning that even relatively high film thicknesses of the corresponding first and second coating films (x) and (y) can be built up without loss of esthetic quality. Properties such as the adhesion or the overall appearance are also outstanding.

What has been said about the coating composition according to the invention applies mutatis mutandis with respect to further preferred embodiments of the inventive process, especially with respect to preferred embodiment of the first and second aqueous coating compositions (X) and (Y) used in steps (1) and (2) of the inventive process.

Inventive Multilayer Coating:

The result after the end of step (4) of the process of the invention is a multilayer coating (MC) of the invention.

What has been said about the coating composition according to the invention and about the inventive process applies mutatis mutandis with respect to further preferred embodiments of the multilayer coating of the present invention.

The invention is described in particular by the following embodiments:

According to a first embodiment, the present invention relates to an aqueous coating composition, preferably a pigmented aqueous basecoat composition, comprising:
  (a) at least one aqueous dispersion of core/shell type particles comprising a polyurethane resin as the core portion and a crosslinked acrylic resin as the shell portion, wherein the particles are obtained by:
    (i) initially charging an aqueous dispersion of at least one polyurethane resin (P) as core portion, and then
    (ii) polymerizing a mixture of olefinically unsaturated monomers in the presence of the polyurethane core portion to obtain the crosslinked acrylic resin (A) shell portion,
  wherein:
    (ii-1) the polymerizing occurs in the presence of a water-soluble initiator;
    (ii-2) a metered addition of the olefinically unsaturated monomers occurs such that a concentration of 6% by weight, based on a total amount of the olefinically unsaturated monomers, in a reaction solution of the polymerizing is not exceeded during the entire duration of the polymerizing; and
    (ii-3) the mixture of the olefinically unsaturated monomers comprises at least one polyolefinically unsaturated monomer, and
  (b) at least one aqueous polyurethane-polyurea dispersion comprising polyurethane-polyurea particles having an average particle size of 40 to 2,000 nm and a gel fraction of at least 50%, the polyurethane-polyurea particles contain, in each case in reacted form:
    at least one polyurethane prepolymer (PP) comprising isocyanate groups and comprising anionic groups and/or groups which are configured to be converted into anionic groups, and
    at least one polyamine (PA) comprising two primary amino groups and one or two secondary amino groups.

According to a second embodiment, the present invention relates to an aqueous coating composition as claimed in embodiment 1, wherein the water-soluble initiator (ii-1) is selected form the group consisting of potassium peroxodisulfate, sodium peroxodisulfate, ammonium peroxodisulfate, hydrogen peroxide, tert-butyl hydroperoxide, 2,2'-azobis(2-amidoisopropane)dihydrochloride, 2,2'-azobis-(N,N'-dimethyleneisobutyramidine)dihydrochloride, 2,2'-azobis(4-cyanopentanoic acid) and mixtures thereof.

According to a third embodiment, the present invention relates to an aqueous coating composition as claimed in embodiments 1 or 2, wherein the metered addition of the olefinically unsaturated monomers (ii-2) occurs such that a concentration of 6% by weight, preferably 5% by weight, very preferably 4% by weight, based on the total amount of the olefinically unsaturated monomers, in the reaction solution is not exceeded during the entire duration of the polymerizing.

According to a fourth embodiment, the present invention relates to an aqueous coating composition as claimed in any of the preceding embodiments, wherein the mixture of the olefinically unsaturated monomers (ii-3) comprises 0.1 to 6 mol %, preferably 0.1 to 2 mol %, based in each case on the total quantity of olefinically unsaturated monomers, of at least one polyolefinically unsaturated monomer.

According to a fifth embodiment, the present invention relates to an aqueous coating composition as claimed in embodiment 6, wherein the at least one polyolefinically unsaturated monomer is selected from allyl (meth)acrylate and/or hexanediol di(meth)acrylate and/or the mixture of the olefinically unsaturated monomers does not contain any further polyolefinically unsaturated monomers.

According to a sixth embodiment, the present invention relates to an aqueous coating composition as claimed in any of the preceding embodiments, wherein the mixture of the olefinically unsaturated monomers (ii-3) comprises 98 to 99.5% by weight of one or more monounsaturated esters of (meth)acrylic acid having unsubstituted alkyl radicals, where the alkyl radicals have a length of 1 to 10, preferably 3 to 5, carbon atoms, and 0.5 to 2% by weight of one or more polyunsaturated esters of (meth)acrylic acid, preferably allyl (meth)acrylate and/or hexanediol di(meth)acrylate, based in each case on the total amount of olefinically unsaturated monomers.

According to a seventh embodiment, the present invention relates to an aqueous coating composition as claimed in any of the preceding embodiments, wherein the mixture of olefinically unsaturated monomers (ii-3) comprises 0 to less than 10% by weight, preferably 0 to less than 5% by weight, more preferably 0% by weight, of vinylaromatic monomers, based in each case on the total amount of olefinically unsaturated monomers.

According to an eighth embodiment, the present invention relates to an aqueous coating composition as claimed in any of the preceding embodiments, wherein the glass transition temperature $T_g$ of the polyurethane resin (P) of the core portion is from −80° C. to 105° C., preferably −60 to 80° C., even more preferably 50 to 60° C., and/or wherein the glass transition temperature $T_g$ of the crosslinked acrylic resin (A) of the shell portion is from −60° C. to 80° C., preferably from −60 to 20° C., measured according to DIN EN ISO 11357-2:2013-05

According to a ninth embodiment, the present invention relates to an aqueous coating composition as claimed in any of the preceding embodiments, wherein the polyurethane resin (P) of the core portion has an acid number of 10 to 60 mg KOH/g, preferably 30 to 40 mg KOH/g, measured according to DIN EN ISO 2114:2002-06, and a OH number of 20 to 80 mg KOH/g, measured according to R.-P. Kruger, R. Gnauck and R. Algeier, Plaste und Kautschuk, 20, 274 (1982).

According to a tenth embodiment, the present invention relates to an aqueous coating composition as claimed in any of the preceding embodiments, wherein the crosslinked acrylic resin (A) of the shell portion has an OH number of 10 to 140 mg KOH/g, measured according to R.-P. Kruger, R. Gnauck and R. Algeier, Plaste und Kautschuk, 20, 274 (1982), and an acid number of 0 to 10 mg KOH/g, measured according to DIN EN ISO 2114:2002-06.

According to an eleventh embodiment, the present invention relates to an aqueous coating composition as claimed in any of the preceding embodiments, wherein the core/shell type particles in the aqueous dispersion (a) have a weight ratio of core to shell from 80:20 to 20:80, preferably from 60:40 to 40:60.

According to a twelfth embodiment, the present invention relates to an aqueous coating composition as claimed in any of the preceding embodiments, wherein the core/shell type particles in the aqueous dispersion (a) have a glass transition temperature of −50 to 30° C., as measured according to DIN EN ISO 11357-2:2013-05.

According to a thirteenth embodiment, the present invention relates to an aqueous coating composition as claimed in any of the preceding embodiments, wherein the core/shell type particles in the aqueous dispersion (a) have an acid number of 10 to 30 mg KOH/g solids, measured according to DIN EN ISO 2114:2002-06, and/or an OH number of 20 to 50 mg KOH/g solids, measured according to R.-P. Kruger, R. Gnauck and R. Algeier, Plaste und Kautschuk, 20, 274 (1982).

According to a fourteenth embodiment, the present invention relates to an aqueous coating composition as claimed in any of the preceding embodiments, wherein the core/shell type particles in the aqueous dispersion (a) have a particle size (z average) of 60 to 250 nm, preferably of 60 to 115 nm, measured by means of photon correlation spectroscopy (PCS) at 25±1° C.

According to a fifteenth embodiment, the present invention relates to an aqueous coating composition as claimed in any of the preceding embodiments, wherein the core/shell type particles in the aqueous dispersion (a) have an acid number of 0 to 220 mg KOH/g solid resin, preferably 0 to 40 mg KOH/g solid resin, more preferably 0 to 25 mg KOH/g solid resin, measured according to DIN EN ISO 2114:2002-06, and an OH number of less than 70 mg KOH/g solid resin, preferably less than 20 mg KOH/g solid resin, measured according to R.-P. Kruger, R. Gnauck and R. Algeier, Plaste and Kautschuk, 20, 274 (1982).

According to a sixteenth embodiment, the present invention relates to an aqueous coating composition as claimed in any of the preceding embodiments, wherein the core/shell type particles in the aqueous dispersion (a) have a weight-average molar mass of $3*10^7$ g/mol to $8.5*10^9$ g/mol, preferably of $3*10^7$ g/mol to $5*10^{10}$ g/mol, measured by means of small-angle laser light scattering.

According to a seventeenth embodiment, the present invention relates to an aqueous coating composition as claimed in any of the preceding embodiments, wherein the aqueous dispersion (a) has a solid content of 20 to 45% by weight, preferably of 25 to 40% by weight, measured according to DIN EN ISO 3251:2008-06.

According to a eighteenth embodiment, the present invention relates to an aqueous coating composition as claimed in any of the preceding embodiments, wherein the aqueous dispersion (a) has a gel content of 40 to 97% by weight, preferably of 75 to 90% by weight, based in each case on solids in the dispersion.

According to a nineteenth embodiment, the present invention relates to an aqueous coating composition as claimed in any of the preceding embodiments, wherein the aqueous coating composition comprises the at least one aqueous dispersion (a) in a total amount of 0.5 to 50% by weight, preferably 2 to 40% by weight, more preferably 3 to 30% by weight, based in each case on the total amount of the aqueous coating composition.

According to an twentieth embodiment, the present invention relates to an aqueous coating composition as claimed in any of the preceding embodiments, wherein the aqueous dispersion (b) has a gel fraction of 70% to 100%, preferably of 80% to 100%, more preferably of 80 to 98%, very preferably of 80 to 90%, based in each case on the solids of the dispersion (b).

According to a twenty-first embodiment, the present invention relates to an aqueous coating composition as claimed in any of the preceding embodiments, wherein the polyurethane-polyurea particles in the dispersion (b) have an average particle size (volume average) of 50 to 1,000 nm, more preferably 60 to 500 nm, and even more preferably 120 to 300 nm, especially preferred 70 to 210 nm, measured by photon correlation spectroscopy (PCS) at 25±1° C.

According to a twenty-second embodiment, the present invention relates to an aqueous coating composition as claimed in any of the preceding embodiments, wherein the polyurethane prepolymer (PP) comprises at least one polyester diol which is a product of a diol and a dicarboxylic acid, and wherein at least 50% by weight of the dicarboxylic acid in preparation of the at least one polyester diol is at least one dimer fatty acid.

According to a twenty-third embodiment, the present invention relates to an aqueous coating composition as claimed in any of the preceding embodiments, wherein the polyurethane prepolymer (PP) comprises carboxylic acid groups.

According to a twenty-fourth embodiment, the present invention relates to an aqueous coating composition as claimed in any of the preceding embodiments, wherein the polyurethane prepolymer (PP) has an acid number, based on the solids content, of 10 to 35 mg KOH/g, particularly 15 to 23 mg KOH/g, measured according to DIN EN ISO 2114: 2002-06.

According to a twenty-fifth embodiment, the present invention relates to an aqueous coating composition as claimed in any of the preceding embodiments, wherein the polyurethane prepolymer (PP) has a number-average molecular weight from 2,000 to 20,000 g/mol, preferably from 3,500 to 6,000 g/mol, measured with a vapor pressure osmometer 10.00 with benzophenone as calibration substance.

According to a twenty-sixth embodiment, the present invention relates to an aqueous coating composition as claimed in any of the preceding embodiments, wherein the polyurethane prepolymer (PP) has an isocyanate content of 0.5 to 6% by weight, preferably 1 to 5% by weight, especially preferably 1.5 to 4% by weight, measured according to DIN EN ISO 3251:2008-06, DIN EN ISO 11909: 2007-05 and DIN EN ISO 14896:2009-07.

According to a twenty-seventh embodiment, the present invention relates to an aqueous coating composition as claimed in any of the preceding embodiments, wherein the polyurethane prepolymer (PP) has an OH number of 0 to less than 15 mg KOH/g, more particularly 0 to less than 10 mg KOH/g, even more preferably 0 to less than 5 mg KOH/g, measured according to R.-P. Kruger, R. Gnauck and R. Algeier, Plaste and Kautschuk, 20, 274 (1982).

According to a twenty-eighth embodiment, the present invention relates to an aqueous coating composition as claimed in any of the preceding embodiments, wherein the at least one polyamine (PA) consists of one or two secondary amino groups, two primary amino groups and aliphatically saturated hydrocarbon groups.

According to a twenty-ninth embodiment, the present invention relates to an aqueous coating composition as claimed in any of the preceding embodiments, wherein the at least one polyamine (PA) is at least one selected from the group consisting of diethylenetriamine, 3-(2-aminoethyl)-aminopropylamine, dipropylene-triamine, N1-(2-(4-(2-aminoethyl)piperazin-1-yl)ethyl)ethane-1,2-diamine, triethylene-tetramine, and N, N'-bis(3-amino-propyl) ethylenediamine and mixtures thereof.

According to a thirtieth embodiment, the present invention relates to an aqueous coating composition as claimed in any of the preceding embodiments, wherein the polyurethane-polyurea particles in the dispersion (b) have an acid number of 10 to 35 mg KOH/g, more particularly of 15 to 23 mg KOH/g, measured according to DIN EN ISO 2114: 2002-06.

According to a thirty-first embodiment, the present invention relates to an aqueous coating composition as claimed in any of the preceding embodiments, wherein the polyurethane-polyurea particles in the dispersion (b) have an OH number of 0 to less than 15 mg KOH/g, more particularly 0 to less than 10 mg KOH/g, more preferably 0 to less than 5 mg KOH/g, measured according to R.-P. Kruger, R. Gnauck and R. Algeier, Plaste and Kautschuk, 20, 274 (1982).

According to a thirty-second embodiment, the present invention relates to an aqueous coating composition as claimed in any of the preceding embodiments, wherein the aqueous dispersion (b) has a content of 25 to 55% by weight of polyurethane-polyurea particles and 45 to 75% by weight of water, and wherein the total fraction of polyurethane-polyurea particles and water in the dispersion (b) is at least 90% by weight, preferably 95% by weight, based in each case on the total amount of the dispersion (b).

According to a thirty-third embodiment, the present invention relates to an aqueous coating composition as claimed in any of the preceding embodiments, wherein the aqueous dispersion (b) contains the polyurethane-polyurea particles in a total amount of 25 to 55% by weight, preferably 30 to 50% by weight, more preferably 35 to 45% by weight, based in each case on the total amount of the dispersion (b).

According to a thirty-fourth embodiment, the present invention relates to an aqueous coating composition as claimed in any of the preceding embodiments, wherein the aqueous dispersion (b) contains 0 to less than 7.5% by weight, preferably 0 to less than 5% by weight, more preferably 0 to less than 2.5% by weight, very preferably 0% by weight, of organic solvents selected from the group consisting of N-methyl-2-pyrrolidone, dimethylformamide, dioxane, tetrahydrofuran, and N-ethyl-2-pyrrolidone and mixtures thereof.

According to a thirty-fifth embodiment, the present invention relates to an aqueous coating composition as claimed in any of the preceding embodiments, wherein the aqueous coating composition comprises the at least one aqueous dispersion (b) in a total amount of 10 to 55% by weight, preferably 15 to 45% by weight, more preferably 20 to 35% by weight, based in each case on the total amount of the aqueous coating composition.

According to a thirty-sixth embodiment, the present invention relates to an aqueous coating composition as claimed in any of the preceding embodiments, wherein the composition comprises a weight ratio of the at least one aqueous dispersion of core/shell type particles (a) to the at least one aqueous polyurethane-polyurea dispersion (b) of 2:1 to 1:15, preferably from 1:1.2 to 1:10, based in each case on the solid content of the dispersions.

According to a thirty-seventh embodiment, the present invention relates to an aqueous coating composition as claimed in any of the preceding embodiments, wherein the solid content of the aqueous coating composition—based on the total amount of the coating composition—is 5 to 80% by weight, more preferably 10 to 75% by weight, very preferably 15 to 65% by weight, measured according to DIN EN ISO 3251:2008-06.

According to a thirty-eighth embodiment, the present invention relates to an aqueous coating composition as claimed in any of the preceding embodiments, wherein the composition further comprises at least one crosslinking agent, selected from the group consisting of polycarboddimides, aminoplast resins, polyisocyanates, blocked polyisocyanates and mixtures thereof, especially polycarbodiimides.

According to a thirty-ninth embodiment, the present invention relates to an aqueous coating composition as claimed in embodiment 38, wherein the crosslinking agent, preferably at least one carbodiimide, is present in a total amount of 0.5 to 20% by weight, more preferably 3 to 15% by weight, very preferably 6 to 11% by weight, based on the total amount of the aqueous coating composition.

According to a fortieth embodiment, the present invention relates to an aqueous coating composition as claimed in embodiments 1 to 37, wherein the composition comprises a crosslinking agent in a total amount of 0% by weight, based on the total amount of the aqueous coating composition.

According to a forty-first embodiment, the present invention relates to an aqueous coating composition as claimed in any of the preceding embodiments, wherein the aqueous coating composition further comprise at least one binder that is different from aqueous dispersions (a) and (b) and is selected from the group consisting of polyurethanes, polyesters, polyacrylates, copolymers of these polymers and mixtures of these polymers, more particularly polyacrylates and/or polyurethane polyacrylates.

According to a forty-second embodiment, the present invention relates to an aqueous coating composition as claimed embodiments 41, wherein the at least one binder is present in a total amount 0.5 to 40% by weight binder solids, more preferably 1 to 30% by weight binder solids, very preferably 1.5 to 20% by weight binder solids, based in each case on the total weight of the aqueous coating composition.

According to a forty-third embodiment, the present invention relates to an aqueous coating composition as claimed in any of the preceding embodiments, wherein the aqueous coating composition further comprise at least one pigment, selected from the group consisting of color pigments, effect pigments and mixtures thereof.

According to a forty-fourth embodiment, the present invention relates to an aqueous coating composition as claimed in embodiment 43, wherein the at least one pigment is present in a total amount 1 to 30% by weight, preferably 1.5 to 20% by weight, more preferably 2 to 15% by weight, based in each case on the total weight of the aqueous coating composition.

According to a forty-fifth embodiment, the present invention relates to an aqueous coating composition as claimed in any of the preceding embodiments, wherein the aqueous coating composition further comprise at least one thickener, selected from the group consisting of phyllosilicates, (meth)acrylic acid-(meth)acrylate copolymers, hydrophobic polyurethanes, ethoxylated polyurethanes, polyamides and their mixtures.

According to a forty-sixth embodiment, the present invention relates to an aqueous coating composition as claimed in embodiment 45, wherein the at least one thickener is present in a total amount 0.01 to 2% by weight, preferably 0.05 to 1% by weight, more preferably 0.1 to 0.6% by weight, based in each case on the total weight of the aqueous coating composition.

According to a forty-seventh embodiment, the present invention relates to a method for forming a multilayer coating (MC) on a substrate (S) comprising the following steps:
(1) coating a first aqueous coating material (X) directly on the substrate (S) to form an uncured first coating film (x),
(2) coating a second aqueous coating material (Y) directly on the uncured first coating film obtained after step (1) to form an uncured second coating film (y),
(3) coating a clear coating material (Z) directly on the uncured second coating film obtained after step (2) to form a clear coating film (z), and then
(4) simultaneously curing these three coating films obtained after steps (1) to (3), characterized in that the first aqueous coating material (X) and/or the second aqueous coating material (Y) are selected from an aqueous coating composition as claimed in embodiments 1 to 44.

According to a forty-eighth embodiment, the present invention relates to a method as claimed in embodiment 47, wherein the substrate (S) is selected from metallic substrates, metallic substrates coated with a cured electrocoat, plastic substrates and substrates comprising metallic and plastic components, especially preferably from metallic substrates coated with a cured electrocoat.

According to a forty-ninth embodiment, the present invention relates to a method as claimed in embodiment 48, wherein the metallic substrate is selected from the group comprising or consisting of iron, aluminum, copper, zinc, magnesium and alloys thereof as well as steel.

According to a fiftieth embodiment, the present invention relates to a method as claimed in embodiments 47 to 49, wherein no preliminary drying or curing is performed after step (1).

According to a fifty-first embodiment, the present invention relates to a method as claimed in embodiments 47 to 50, wherein the weight ratio of the at least one aqueous dispersion of core/shell type particles (a) to the at least one aqueous polyurethane-polyurea dispersion (b) in the first aqueous coating material (X) is from 10:1 to 1:30, preferably from 1:1.6 to 1:10, based in each case on the solid content of the dispersions.

According to a fifty-second embodiment, the present invention relates to a method as claimed in embodiments 47 to 51, wherein the first aqueous coating material (X) comprises the at least one aqueous dispersion (a) in a total amount of 0.5 to 40% by weight, preferably 2 to 30% by weight, more preferably 3 to 25% by weight, based in each case on the total amount of the coating material (X).

According to a fifty-third embodiment, the present invention relates to a method as claimed in embodiments 47 to 52, wherein the weight ratio of the at least one aqueous dispersion of core/shell type particles (a) to the at least one aqueous polyurethane-polyurea dispersion (b) in the second aqueous coating material (Y) is from 2:1 to 1:10, preferably from 1:1.2 to 1:5, based in each case on the solid content of the dispersions.

According to a fifty-fourth embodiment, the present invention relates to a method as claimed in embodiments 47 to 53, wherein the second aqueous coating material (Y) comprises the at least one aqueous dispersion (a) in a total amount of 1 to 45% by weight, preferably 5 to 35% by weight, more preferably 10 of 25% by weight, based in each case on the total amount of the coating material (Y).

According to a fifty-fifth embodiment, the present invention relates to a method as claimed in embodiments 47 to 54, wherein the second aqueous coating material (Y) comprises a crosslinking agent in a total amount of 0% by weight, based on the total amount of the coating material (Y).

According to a fifty-sixth embodiment, the present invention relates to a method as claimed in embodiments 47 to 55, wherein the clear coating material (Z) is a solvent-based 1K or 2K clear coating material.

According to a fifty-seventh embodiment, the present invention relates to a method as claimed in embodiments 47 to 56, wherein the clear coating material (Z) comprise at least one binder selected from the group consisting of hydroxyfunctional polyacrylates and at least one crosslinker selected form the group consisting of blocked and/or unblocked polyisocyanates.

According to a fifty-eighth embodiment, the present invention relates to a method as claimed in embodiments 47 to 57, wherein the simultaneous curing (4) is performed at temperatures of 60 to 90° C., preferably 85° C., for a period of 5 to 60 min, preferably 15 to 25 min.

According to a fifty-ninth embodiment, the present invention relates to a multilayer coating (MC) produced by the method as claimed in any of embodiments 47 to 58.

EXAMPLES

The present invention will now be explained in greater detail using working examples, but the present invention is in no way limited to these working examples. Moreover, the terms "parts", "%" and "ratio" in the examples denote "parts by mass", "mass %" and "mass ratio" respectively unless otherwise indicated.

Methods of Determination:

1. Solids Content (Solids, Nonvolatile Fraction)

Unless otherwise indicated, the solids content, also referred to as solid fraction hereinafter, was determined in accordance with DIN EN ISO 3251 at 130° C. and 60 min, initial mass 1.0 g.

2. Isocyanate Content

The isocyanate content, also referred to below as NCO content, was determined by adding an excess of a 2% N,N-dibutylamine solution in xylene to a homogeneous solution of the sample in acetone/N-ethylpyrrolidone (1:1 vol %), by potentiometric back-titration of the amine excess with 0.1 N hydrochloric acid, in a method based on DIN EN ISO 3251, DIN EN ISO 11909, and DIN EN ISO 14896. The NCO content of the polymer, based on solids, can be calculated via the fraction of the polymer (solids content) in solution.

3. Hydroxyl Number

The hydroxyl number was determined on the basis of R.-P. Kruger, R. Gnauck and R. Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anhydride remaining after acetylation and conducting a potentiometric back-titration of the acetic acid with alcoholic potassium hydroxide solution. Acetylation times of 60 minutes were sufficient in all cases to guarantee complete conversion.

4. Acid Number

The acid number was determined on the basis of DIN EN ISO 2114 in homogeneous solution of tetrahydrofuran (THF)/water (9 parts by volume of THF and 1 part by volume of distilled water) with ethanolic potassium hydroxide solution.

5. Glass Transition Temperature Tg (DSC)

Unless otherwise indicated, the glass transition temperature, also referred as $T_g$ (DSC), was determined with differential scanning calorimeter (TA Instruments Q2000) from the second heat run between −80° C. to 150° C. at a heating rate of 10 K/min in accordance with DIN EN ISO 11357-2.

6. Viscosity

Unless otherwise indicated, the viscosity, was determined with a cylinder rotation viscosimeter at 23° C. and a shear rate of 1000 s$^{-1}$ in accordance with DIN 53014.

7. Solvent Content

The amount of an organic solvent in a mixture, as for example in an aqueous dispersion, was determined by means of gas chromatography (Agilent 7890A, 50 m silica capillary column with polyethylene glycol phase or 50 m silica capillary column with polydimethylsiloxane phase, helium carrier gas, 250° C. split injector, 40-220° C. oven temperature, flame ionization detector, 275° C. detector temperature, n-propyl glycol as internal standard).

8. Average Particle Size

The average particle sizes of the particles present in the dispersions (a) and (b) were determined in the context of the present invention by means of photon correlation spectroscopy (PCS).

Employed specifically for the measurement was a Malvern Nano S90 (from Malvern Instruments) at 25±1° C. The instrument covers a size range from 3 to 3,000 nm and was equipped with a 4 mW He—Ne laser at 633 nm. The dispersions (a) and (b) were diluted with particle-free, deionized water as dispersing medium, before being subjected to measurement in a 1 ml polystyrene cell at suitable scattering intensity. Evaluation took place using a digital correlator, with the assistance of the Zetasizer analysis software, version 6.32 (from Malvern Instruments). Measurement took place five times, and the measurements were repeated on a second, freshly prepared sample. The standard deviation of a 5-fold determination was 4%. The reported average particle size (volume average) is the arithmetic mean of the average particle size (volume average) of the individual preparations while the Z average is the intensity weighted mean size. Verification was carried out using polystyrene standards having certified particle sizes between 50 to 3,000 nm.

9. Gel Fraction

The gel fraction of the particles present in the dispersions (a) and (b) is determined gravimetrically in the context of the present invention. First of all, the respective polymer was isolated from a sample of an aqueous dispersion (a) or (b) (initial mass 1.0 g) by freeze-drying. Following determination of the solidification temperature—the temperature above which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymer to 25° C., rapid freeze-drying of the polymers was achieved; after a drying time of typically 12 hours, the amount of isolated polymer (solid fraction, determined by the freeze-drying) was constant and no longer underwent any change even on prolonged freeze-drying. Subsequent drying at a temperature of the surface beneath the polymer of 30° C. with the ambient pressure reduced to maximum (typically between 0.05 and 0.03 mbar) produced optimum drying of the polymer.

The isolated polymer was subsequently sintered in a forced air oven at 130° C. for one minute and thereafter extracted for 24 hours at 25° C. in an excess of tetrahydrofuran (ratio of tetrahydrofuran to solid fraction=300:1). The insoluble fraction of the isolated polymer (gel fraction) was then separated off on a suitable frit, dried in a forced air oven at 50° C. for 4 hours, and subsequently reweighed.

It was further ascertained that at the sintering temperature of 130° C., with variation in the sintering times between one minute and twenty minutes, the gel fraction found for the microgel particles is independent of sintering time. It can therefore be ruled out that crosslinking reactions subsequent to the isolation of the polymeric solid increase the gel fraction further.

The gel fraction determined in this way in accordance with the invention is also called gel fraction (freeze-dried).

In parallel, a gel fraction, hereinafter also called gel fraction (130° C.), was determined gravimetrically, by isolating a polymer sample from aqueous dispersion (initial mass 1.0 g) at 130° C. for 60 minutes (solids content). The mass of the polymer was ascertained, after which the polymer was extracted in an excess of tetrahydrofuran at 25° C., in analogy to the procedure described above, for 24 hours, after which the insoluble fraction (gel fraction) was separated off, dried, and reweighed.

10. Solubility in Water

The solubility of an organic solvent in water was determined at 20° C. as follows. The respective organic solvent and water were combined in a suitable glass vessel, mixed, and the mixture was subsequently equilibrated. The amounts of water and of the solvent were selected such that two phases separate from one another were obtained after the equilibration. After the equilibration, a sample is taken from the aqueous phase (that is, the phase containing more water than organic solvent) using a syringe, and this sample was diluted with tetrahydrofuran in a 1/10 ratio, the fraction of the solvent being determined by means of gas chromatography (for conditions see section 8. Solvent content).

If two phases do not form irrespective of the amounts of water and the solvent, the solvent is miscible with water in any weight ratio. This solvent that is therefore infinitely soluble in water (acetone, for example) is therefore at any rate not a solvent (OS).

11. Preparation of Multilayer Coatings

A cationic electrodeposition coating material (product name "CathoGuard 800", produced by BASF Coatings) was coated by electrostatic deposition on a zinc phosphate-treated mild steel plate with a film thickness after drying of 20 μm. The plate was then baked for 25 minutes at 175° C. to obtain an electrodeposition coating plate for the evaluation (hereinafter referred to as the "electrodeposited plate").

For preparation of the multilayer coating, the eletrodeposited plate was coated as described below using a rotary atomization type bell coater (product name "Metallic bell RB-1000 bell", manufactured by ABB) at a temperature of 25° C. and a relative humidity of 75%:

The first aqueous coating material (X) was applied to the electrodeposited plate such that the film thickness after drying was 20 μm. The plate was kept at room temperature for 5 minutes and then coated with the second aqueous coating material (Y) such that the film thickness after drying was 12 μm. The plate was kept at room temperature for 5 minutes and then dried at 80° C. for 5 minutes. After cooling the plate to room temperature, a clear coating material (product name "Evergloss", produced by BASF Coatings) was coated on the plate such that the film thickness after drying was 40 prn. Following this coating, the plate was kept at room temperature for 10 minutes and then baked at 85° C. for 25 minutes to produce a plate coated with the inventive multilayer coating.

12. Test Measurements

The coated plate was subjected to the following tests:

12.1 Evaluation of Chipping Resistance

The obtained plate having a size of 70 mm×150 mm was set at an angle of 45° in a Gravelometer (produced by the Suga Shikenki Co.) in an environment at −20° C. and 50 g of No. 7 broken stone was jetted out at an air pressure of 4 kg/cm$^2$ onto the paint film surface. Afterwards, the area of paint film which had been peeled away was evaluated. Smaller numerical values indicate higher chipping resistance. The panel had a satisfying chipping resistance if not more than 1.0 mm$^2$/cm$^2$ was peeled away.

12.2 Evaluation of Film Appearance

The short-wave value (SW value) and the long-wave value (LW value) were measured with a wave scanner DOI produced by the BYK Co. The smaller the numerical value the better the appearance. The test panel passed this test if the SW is not more than 10 and the LW is not more than 3.

12.3 Evaluation of Adhesion

Initial Adhesion Test:

The coated plate was divided into 100 grid cells measuring 2 mm×2 mm using a cutter knife. Sellotape was strongly bonded to the grid cells and the edge of the tape was peeled off at an angle of 4 5° in a single movement, after which film appearance of the grid cells was observed and evaluated as follows:

OK: No peeling off of coating film observed.

Not OK: Peeling off of coating film observed.

Adhesion Test after Water Resistance:

The coated plate was immersed in warm water at 40° c. for 20 days and then initial adhesion test was performed.

Adhesion Test for the Re-Coated Plate:

The first aqueous coating material (X), the second aqueous coating material (Y) and the clear coating material were applied on the electrodeposited plate according to the method described in point 11. However, the plate was baked at 100° C. for 25 minutes after application of the clear coating composition. Next, the coated plate was re-coated with the first aqueous coating material (X), the second aqueous coating material (Y) and the clear coating material and then the re-coated plate was baked at 80° C. for 25 minutes. The initial adhesion test was performed on the obtained re-coated plate.

12.4 Evaluation of the Pinhole Number

The electrodeposited plate having a size of 450 mm×300 mm size was prepared. The first aqueous coating material (X), the second aqueous coating material (Y) and the clear coating material were applied as described in point 11. However, the thickness of the first aqueous coating material (X) was 30 μm after drying and the thickness of second aqueous coating material (Y) was 20 μm after drying.

The pinhole number of the coated plate was counted visually. Lower pinhole numbers are desirable.

Preparation of Aqueous Dispersions (a) and (b) and Aqueous Coating Composition

1. Aqueous Dispersions (a)

Aqueous dispersions of core/shell type particles (a) were prepared based on WO 2015/007427 A1 as described in points 1.1 to 1.3.

1.1 Aqueous Dispersion of Core/Shell Type Particles (PD-A1)

Preparation of a Dispersion of an Unsaturated Polyesterureaurethane Having Allyl Groups (Allyl-PD):

A polyurethane dispersion of an allyl-containing polyester ureaurethane (Allyl-PD) was prepared based on the patent specification WO 2015/007427 A1, page 24, example D-P1, with the following modifications: the polyester ureaurethane contains allyl groups and N-methylpyrrolidone was completely exchanged against methyl ethyl ketone. The synthesis is performed as follows:

In a reaction vessel equipped with a stirrer, internal thermometer, reflux condenser and electrical heater, 440.0 parts by weight of a linear polyester polyol and 71.0 parts by weight of dimethylolpropionic acid (from GEO Speciality Chemicals) were dissolved in 425.4 parts by weight of methyl ethyl ketone under nitrogen. The linear polyester polyol had been prepared beforehand from dimerized fatty acid (Pripol® 1012, from Uniqema), isophthalic acid (from BP Chemicals) and hexane-1,6-diol (from BASF SE) (weight ratio of the starting materials:dimeric fatty acid to isophthalic acid to hexane-1,6-diol=54.00:30.02:15.98) and had a hydroxyl number of 73 mg KOH/g solids and a number-average molar mass of 1379 g/mol.

To the resulting solution were added, at 45° C., 294.2 parts by weight of isophorone diisocyanate (Basonat® I, from BASF SE) having an isocyanate content of 37.75% by weight. After the exothermic reaction had subsided, the reaction mixture was heated gradually to 80° C. while stirring. Stirring was continued at this temperature until the isocyanate content of the solution was 3.3% by weight. Thereafter, the reaction mixture was cooled to 65° C., and a mixture of 9.4 parts by weight of allyl alcohol (from LyondellBasell), 22.2 parts by weight of trimethylolpropane (from BASF SE) and 21.3 parts by weight of methyl ethyl ketone were added simultaneously. The resulting reaction mixture was stirred at 65° C. until the isocyanate content of the solution decreased to 1.0% by weight. Then, 22.6 parts by weight of diethanolamine (from BASF SE) were added and the content of isocyanate groups was monitored until no free isocyanate groups were detectable any longer. The resulting dissolved polyurethane was admixed with 28.8 parts by weight of methyl ethyl ketone, 142.3 parts by weight of methoxypropanol and 45.5 parts by weight of triethylamine (from BASF SE). 30 minutes after the addition of triethylamine, the temperature of the solution was lowered to 60° C., and then 1977 parts by weight of deionized water were added while stirring over the course of 30 minutes. The methyl ethyl ketone was distilled out of the resulting dispersion at 60° C. under reduced pressure. Thereafter, any losses of solvent and water were compensated.

The dispersion of an allyl-containing polyesterureaurethane thus obtained had a solids content of 29.0% by weight, an acid number of 34.6 mg KOH/g solids content, a hydroxyl number of 27.7 mg KOH/g solids content and a pH of 7.1 (measured at 23° C.). The methoxypropanol level was 3,6% by weight (GC) and the methyl ethyl ketone level 0,1% by weight (GC).

Preparation of the Aqueous Dispersion of Core/Shell Type Particles (PD-A1):

The aqueous dispersion of core/shell type particles (PD-A1) was prepared based on the patent specification WO 2015/007427 A1, page 34, example D-B1, with the following modifications: the polyester ureauretane polymer has allyl groups, n-butyl methacrylate and 2-hydroxyethyl acrylate were used as monomers and the final dispersion is free from pyrrolidones. The aqueous dispersion (PD-A1) is obtained as follows:

For preparation of the primary dispersion of a polyesterureaurethane-polyacrylate copolymer, under a nitrogen atmosphere, 1961.2 parts by weight of previously prepared Allyl-PD were diluted with 43.3 parts by weight of methoxypropanol and 744.4 parts by weight of deionized water, neutralized with 3.6 parts by weight of triethylamine (from BASF SE) and heated to 80° C. After the reactor contents had been heated to 80° C., 0.6 part by weight of ammonium peroxodisulfate dissolved in 35.7 parts by weight of deionized water was added to the reactor under standard pressure. Subsequently, while stirring continually, a mixture of 538.3 parts by weight of n-butyl methacrylate, 26.3 parts by weight of 2-hydroxyethyl acrylate, 4.2 parts by weight of allyl methacrylate and 70.0 parts by weight of butyl glycol (from BASF SE) was added homogeneously over the course of 5 hours. With commencement of the addition of the monomer mixture, a solution of 1.1 parts by weight of ammonium peroxodisulfate in 71.3 parts by weight of deionized water was likewise added within five hours.

During the free-radical polymerization, at intervals of 30 minutes, the content of free monomers was determined by means of gas chromatography, and the highest total monomer content based on dispersion was determined after 30 min to be 0.5% by weight (3.1% by weight based on vinyl monomer).

After the simultaneous end of the metered addition of monomers and initiator, the resulting reaction mixture was stirred at 80° C. for a further hour and then cooled to room temperature.

After cooling to room temperature (23° C.), the dispersion was filtered through a filter having a pore size of 25 μm. The polyesterureaurethane-polyacrylate copolymer dispersion (PD-A1) was free from coagulum. The stable, milky white aqueous dispersion of core/shell type particles (PD-A1) thus obtained has the following characteristics:

| | |
|---|---|
| Polyurethane content | 50 wt.-% solids content (calculated based on theory) |
| Solids content | 32.7 wt.-% |
| Acid number | 22 mg KOH/g solids content |
| Hydroxyl number | 25 mg KOH/g solids content |
| pH | 7.1 (original, measured at 23° C.) |
| Viscosity | 85 mPa · s |
| Coagulum | 0.0 wt.-% (determined gravimetrically after filtration and drying at 130° C., 60 min) |
| Particle size | 109 nm (volume average) |
| Solvent contents | |
| methoxypropanol | 3.3 wt.-% |
| butyl glycol | 2.0 wt.-% |
| methyl ethyl ketone | 0.1 wt.-% |
| Gel fraction | 82.7 wt.-% |
| Gel fraction (freeze-dried) | 80.7 wt.-% |
| Glass transition temperature | 20° C. |

1.2 Aqueous Dispersions of Core/Shell Type Particles (PD-A2)

Analogously to the preparation of PD-A1, an aqueous dispersions of core/shell type particles (PD-A2) was prepared. However, the polyester ureaurethane content was decreased to 33.3% by weight:

For preparation of the primary dispersion of a polyesterurethane-polyacrylate copolymer, under a nitrogen atmosphere, 1372.8 parts by weight of Allyl-PD prepared in point 1.1 were diluted with 64.4 parts by weight of methoxypropanol and 1106.9 parts by weight of deionized water, neutralized with 5.1 parts by weight of triethylamine (from BASF SE) and heated to 80° C. After the reactor contents had been heated to 80° C., 0.7 part by weight of ammonium peroxodisulfate dissolved in 46.4 parts by weight of deionized water was added to the reactor under standard pressure. Subsequently, while stirring continually, a mixture of 697.7 parts by weight of n-butyl methacrylate, 36.2 parts by weight of 2-hydroxyethyl acrylate, 5.5 parts by weight of allyl methacrylate (all monomers BASF SE) and 70.0 parts by weight of butyl glycol (from BASF SE) was added homogeneously over the course of 5 hours. With commencement of the addition of the monomer mixture, a solution of 1.5 parts by weight of ammonium peroxodisulfate in 92.7 parts by weight of deionized water was likewise added within five hours.

During the free-radical polymerization, at intervals of 30 minutes, the content of free monomers was determined by means of gas chromatography, and the highest total monomer content based on dispersion was determined after 30 min to be 0.5% by weight (2.4% by weight based on vinyl monomer).

After the simultaneous end of the metered addition of monomers and initiator, the resulting reaction mixture was stirred at 80° C. for a further hour and then cooled to room temperature.

After cooling to room temperature (23° C.), the dispersion was filtered through a filter having a pore size of 25 μm. The stable milky white aqueous dispersion of core/shell type particles (PD-A2) thus obtained has the following characteristics:

| | |
|---|---|
| Polyurethane content | 33 wt.-% solids content (calculated based on theory) |
| Solids content | 32.8 wt.-% |
| Acid number | 14 mg KOH/g solids content |
| Hydroxyl number | 26 mg KOH/g solids content |
| pH | 7.3 (original, measured at 23° C.) |
| Viscosity | 55 mPa · s |
| Coagulum | 0.2 wt.-% (determined gravimetrically after filtration and drying at 130° C., 60 min) |
| Particle size | 90 nm (volume average) |
| Solvent contents | |
| methoxypropanol | 3.4 wt.-% |
| butyl glycol | 2.0 wt.-% |
| methyl ethyl ketone | 0.1 wt.-% |
| Gel fraction | 86.1 wt.-% |
| Gel fraction (freeze-dried) | 85.5 wt.-% |
| Glass transition temperature | 18° C. |

1.3 Aqueous Dispersions of Core/Shell Type Particles (PD-A3)

Analogously to the preparation of PD-A1, an aqueous dispersions of core/shell type particles (PD-A3) was prepared. However, n-butyl acrylate, 4-hydroxybutyl acrylate and ally methacrylate were used as monomers:

For preparation of the primary dispersion of a polyesterurethane-polyacrylate copolymer, under a nitrogen atmosphere, 1961.2 parts by weight of Allyl-PD prepared in point 1.1 were diluted with 46.3 parts by weight of methoxypropanol and 795.8 parts by weight of deionized water, neutralized with 3.5 parts by weight of triethylamine (from BASF SE) and heated to 80° C. After the reactor contents had been heated to 80° C., 0.3 part by weight of ammonium peroxodisulfate dissolved in 17.8 parts by weight of deionized water was added to the reactor under standard pressure.

Subsequently, while stirring continually, a mixture of 495.1 parts by weight of n-butyl acrylate, 68.9 parts by weight of 4-hydroxybutyl acrylate, 4.8 parts by weight of allyl methacrylate (all monomers from BASF SE) and 70.0 parts by weight of butyl glycol (from BASF SE) was added homogeneously over the course of 5 hours. With commencement of the addition of the monomer mixture, a solution of 0.6 parts by weight of ammonium peroxodisulfate in 35.7 parts by weight of deionized water was likewise added within five hours.

During the free-radical polymerization, at intervals of 30 minutes, the content of free monomers was determined by means of gas chromatography, and the highest total monomer content based on dispersion was determined after 30 min to be 0.4% by weight (2.5% by weight based on vinyl monomer).

After the simultaneous end of the metered addition of monomer and initiator, the resulting reaction mixture was stirred at 80° C. for a further hour and then cooled to room temperature.

After cooling to room temperature (23° C.), the dispersion was filtered through a filter having a pore size of 25 μm. The stable milky white aqueous dispersion of core/shell type particles thus obtained has the following characteristics:

| | |
|---|---|
| Polyurethane content | 50 wt.-% solids content (calculated based on theory) |
| Solids content | 32.5 wt.-% |
| Acid number | 19 mg KOH/g solids content |
| Hydroxyl number | 40 mg KOH/g solids content |
| pH | 7.2 (original, measured at 23° C.) |
| Viscosity | 136 mPa · s |
| Coagulum | 0.0 wt.-% (determined gravimetrically after filtration and drying at 130° C., 60 min) |
| Particle size | 68 nm (volume average) |
| Solvent contents | |
| methoxypropanol | 3.3 wt.-% |
| butyl glycol | 2.0 wt.-% |
| methyl ethyl ketone | 0.1 wt.-% |
| Gel fraction | 86.6 wt.-% |
| Gel fraction (freeze-dried) | 84.0 wt.-% |
| Glass transition temperature | −38° C. |

2 Aqueous Dispersion of Polyurethane-Polyurea Particles (b) (PD-B)

An aqueous dispersion of polyurethane-polyurea particles (b) was prepared according to synthesis example "PD" on pages 72 to 74 of WO 2016/177514 A1.

3. Preparation of Aqueous Basecoat Materials

The following should be taken into account regarding the formulation constituents and amounts thereof as indicted in the tables hereinafter. When reference is made to a commercial product or to a preparation protocol described elsewhere, the reference, independently of the principal designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, for example, "polymer", "polyester", or "polyurethane-modified polyacrylate". This must be taken into account if conclusions are to be drawn concerning the amount of the active substance (of the polymer).

All proportions indicated in the tables are parts by weight.

3.1 Production of Black Paste P1

The black paste was produced from 25 parts by weight of an acrylated polyurethane dispersion (prepared according to WO 91/15528—binder dispersion A), 10 parts by weight of carbon black, 0.1 parts by weight of methyl isobutyl ketone, 1.36 parts by weight of dimethylethanolamine (10% strength in DI water), 2 parts by weight of a commercial polyether (Pluriol® P900 from BASF SE), and 61.45 parts by weight of deionized water. The black paste has a pigment content of 10 parts by weight and a resin solid content of 10 parts by weight.

3.2 Production of White Paste P2

The white paste was produced from 43 parts by weight of an acrylated polyurethane dispersion (prepared according to WO 91/15528—binder dispersion A), 50 parts by weight of titanium rutile 2310, 3 parts by weight of 1-propoxy-2-propanol, and 4 parts by weight of deionized water. The white paste has a pigment content of 50 parts by weight and a resin solid content of 17.2 parts by weight.

3.3 Production of First Aqueous Coating Materials (X):

The components 1 to 9 listed in table 1 were stirred together in the stated order to give first aqueous coating materials (X). After addition, the first aqueous coating materials (X) are stirred for 30 min. and adjusted with N,N-dimethylethanolamine (from BASF SE) to pH of 8.5 (component 10). Afterwards, the viscosity was adjusted by addition of deionized water (component 11) to 100 mPa*s under a shearing load of 1000 s$^{-1}$ (measured using a rotational viscosimeter (Rheomat RM 180 instrument from Mettler-Toledo) at 23° C.).

TABLE 1

First aqueous coating materials (X-I1) to (X-I6) and (X-C1) to (X-C2)

| | | X-I1* | X-I2* | X-I3* | X-I4* | X-I5* | X-I6* | X-C1 | X-C2 |
|---|---|---|---|---|---|---|---|---|---|
| 1 | Aqueous dispersion of core/shell type particles (a) (PD-A1) | 3.00 | 30.0 | 26.0 | 11.0 | — | — | 50.0 | — |
| 2 | Aqueous dispersion of core/shell type particles (a) (PD-A2) | — | — | — | — | 11.0 | — | — | — |

TABLE 1-continued

First aqueous coating materials (X-I1) to (X-I6) and (X-C1) to (X-C2)

| | | X-I1* | X-I2* | X-I3* | X-I4* | X-I5* | X-I6* | X-C1 | X-C2 |
|---|---|---|---|---|---|---|---|---|---|
| 3 | Aqueous dispersion of core/shell type particles (a) (PD-A3) | — | — | — | — | — | 11.0 | — | — |
| 4 | Aqueous polyurethane-polyurea dispersion (b) (PD-B) | 36.6 | 12.2 | 25.4 | 44.7 | 44.7 | 44.7 | — | 50.0 |
| 5 | Butyl glycol | 2.00 | 2.00 | 2.00 | 2.00 | 2.00 | 2.00 | 2.00 | 2.00 |
| 6 | White paste P2 | 38.0 | 38.0 | 38.0 | 38.0 | 38.0 | 38.0 | 38.0 | 38.0 |
| 7 | Black paste P1 | 1.00 | 1.00 | 1.00 | 1.00 | 1.00 | 1.00 | 1.00 | 1.00 |
| 8 | TMDD BG 52 (contains 48% by wt. butyl glycol) | 0.500 | 0.500 | 0.500 | 0.500 | 0.500 | 0.500 | 0.500 | 0.500 |
| 9 | Rheovis ® HS 1162 (BASF SE) | 0.200 | 0.200 | 0.200 | 0.200 | 0.200 | 0.200 | 0.200 | 0.200 |
| 10 | N,N-dimethylethanolamine (10% by wt. in water) | 1.20 | 1.30 | 1.20 | 1.10 | 1.10 | 1.10 | 1.10 | 1.10 |
| 11 | Water | 17.5 | 14.8 | 5.70 | 1.50 | 1.50 | 1.50 | 7.20 | 7.20 |
| | Ratio of (a):(b)** | 1:15 | 2:1 | 1:1.2 | 1:5 | 1:5 | 1:5 | 1:0 | 0:1 |
| | Solids content [%] | 41.8 | 40.8 | 44.8 | 47.6 | 47.6 | 47.6 | 42.4 | 46.2 |

*inventive aqueous coating compositions
**ratio of aqueous dispersion of core/shell type particles (a) to aqueous polyurethane-polyurea dispersion (b) based on solid content of the respective dispersions The inventive aqueous coating materials X-I1 to X-I6 are stable on storage at 40° C. for 4 weeks. They show no sedimentation tendency at all and no significant change (less than 15%) in the low-shear viscosity (shearing load of 1 s$^{-1}$, measured with a rotational viscosimeter (Rheomat RM 180 instrument from Mettler-Toledo) at 23° C.).

3.4 Production of Second Aqueous Coating Materials (Y):

The components listed in Table 2 under "aqueous phase" are added in the stated order to give an aqueous mixture. The aqueous mixture is stirred for 60 min. In the next step, components listed under "organic phase" are added to produce an organic mixture. The organic mixture is added to the aqueous mixture, stirred for 30 min. and adjusted with N,N-dimethylethanolamine (from BASF SE) to pH of 8.0. Afterwards, the viscosity is adjusted with deionized water to 100 mPa*s under a shearing load of 1000 s$^{-1}$ measured using a rotational viscosimeter (Rheomat RM 180 instrument from Mettler-Toledo) at 23° C. The respective amounts of N,N-dimethylethanolamine and water necessary to adjust the pH and the viscosity are listed under "Adj." in Table 2.

TABLE 2

Second aqueous coating materials (Y-I1) to (Y-I6) and (Y-C1) to (Y-C2)

| | | Y-I1* | Y-I2* | Y-I3* | Y-I4* | Y-I5* | Y-I6* | Y-C1 | Y-C2 |
|---|---|---|---|---|---|---|---|---|---|
| Aqueous phase | Aqueous dispersion of core/shell type particles (a) (PD-A1) | 3.00 | 30.0 | 26.0 | 11.0 | — | — | 50.0 | — |
| | Aqueous dispersion of core/shell type particles (a) (PD-A2) | — | — | — | — | 11.0 | — | — | — |
| | Aqueous dispersion of core/shell type particles (a) (PD-A3) | — | — | — | — | — | 11.0 | — | — |
| | Aqueous polyurethane-polyurea dispersion (b) (PD-B) | 36.6 | 12.2 | 25.4 | 44.7 | 44.7 | 44.7 | — | 50.0 |
| | 2-Ethylhexanol | 1.00 | 1.00 | 1.00 | 1.00 | 1.00 | 1.00 | 1.00 | 1.00 |
| | TMDD BG 52 (contains 48% by wt. butyl glycol) | 1.00 | 1.00 | 1.00 | 1.00 | 1.00 | 1.00 | 1.00 | 1.00 |
| | Water | 10.0 | 10.0 | 10.0 | 10.0 | 10.0 | 10.0 | 10.0 | 10.0 |
| | Inorganic thickener[1] | 7.00 | 7.00 | 7.00 | 7.00 | 7.00 | 7.00 | 7.00 | 7.00 |
| | Rheovis ® AS 1130 (BASF SE) | 0.300 | 0.300 | 0.300 | 0.300 | 0.300 | 0.300 | 0.300 | 0.300 |
| Organic phase | ALU STAPA IL HYDROLAN 2192 Nr. 5[2] | 4.00 | 4.00 | 4.00 | 4.00 | 4.00 | 4.00 | 4.00 | 4.00 |
| | ALU STAPA IL HYDROLAN 2156 Nr. 5[3] | 2.00 | 2.00 | 2.00 | 2.00 | 2.00 | 2.00 | 2.00 | 2.00 |
| | Butyl glycol | 6.50 | 6.50 | 6.50 | 6.50 | 6.50 | 6.50 | 6.50 | 6.50 |
| | Polyester[4] | 4.00 | 4.00 | 4.00 | 4.00 | 4.00 | 4.00 | 4.00 | 4.00 |

TABLE 2-continued

Second aqueous coating materials (Y-I1) to (Y-I6) and (Y-C1) to (Y-C2)

|  |  | Y-I1* | Y-I2* | Y-I3* | Y-I4* | Y-I5* | Y-I6* | Y-C1 | Y-C2 |
|---|---|---|---|---|---|---|---|---|---|
| Adj. | N,N-dimethylethanolamine (10% by wt. in water) | 2.20 | 2.40 | 2.20 | 2.10 | 2.30 | 2.10 | 2.10 | 2.20 |
|  | water | 22.4 | 19.6 | 10.6 | 6.40 | 6.40 | 6.40 | 12.1 | 12.0 |
|  | Ratio of (a):(b)** | 1:15 | 2:1 | 1:1.2 | 1:5 | 1:5 | 1:5 | 1:0 | 0:1 |
|  | Solids content [%] | 22.7 | 21.7 | 25.7 | 28.6 | 28.6 | 28.6 | 23.3 | 27.1 |

*inventive aqueous coating compositions
[1] aqueous solution of 3% by wt. Laponite ® RD (sodium-lithium-magnesium sheet silicate, Rockwood Additives) and 3% by wt. Pluriol ® P 900 (BASF SE)
[2] Aluminum pigment (Eckart Effect Pigments)
[3] Aluminum pigment (Eckart Effect Pigments)
[4] prepared according to DE 4009858 Al, example D (column 16, lines 37 to 59)
**ratio of aqueous dispersion of core/shell type particles (a) to aqueous polyurethane-polyurea dispersion (b) based on solid content of the respective dispersions The inventive aqueous coating materials Y-I1 to Y-I6 are stable on storage at 40° C. for 4 weeks. They show no sedimentation tendency g; at all and no significant change (less than 15%) in the low-shear viscosity (shearing load of $1\ s^{-1}$, measured with a rotational viscosimeter (Rheomat RM 180 instrument from Mettler-Toledo) at 23° C.).

Results

1. Multilayer Coatings MC-I1 to MCI-6, MC-C1 and MC-C2

Inventive multilayer coatings MC-I1 to MC-I6 were prepared as described above (see point 11 of "Methods of determination") using inventive first aqueous coating materials X-I1 to X-I6 and inventive second aqueous coating materials Y-I1 to Y-I6 (see Table 3 for used combinations of first and second coating materials). Moreover, comparative multilayer coatings MC-C1 and MC-C2 were prepared as described above (see point 11 of "Methods of determination") using first aqueous coating materials X-C1 and X-C2 and second aqueous coating materials Y-C1 and Y-C2, respectively. Then inventive multilayer coatings MC-I1 to MC-I6 were compared to comparative multilayer coatings MC-C1 and MC-C2 regarding chipping resistance, film appearance, adhesion, and pinhole resistance. The obtained results are shown in Table 3.

Comparative multilayer coating MC-C1 prepared from coating materials (X) and (Y) only comprising an aqueous dispersion of core/shell type particles (a) has a lower chipping resistance, film appearance, and pinhole resistance than inventive multilayer coatings MC-I1 to MC-I6, prepared from coating materials (X) and (Y) comprising the claimed combination of dispersions (a) and (b). Additionally, the adhesion after immersion in water is lower for the comparative multilayer coating MC-C1.

Use of polyurethane-polyurea dispersion (b) in aqueous coating materials (X) and (Y) (comparative multilayer coating MC-C2) leads to improved chipping resistance and adhesion after immersion in water as compared to multilayer coating MC-C1. However, the re-coated adhesion is decreased significantly.

In contrast, the use of a combination of an aqueous dispersion of core/shell type particles (a) and an aqueous polyurethane-polyurea dispersion (b) to prepare the inventive multilayer coatings MC-I1 to MC-I7 not only leads to excellent chipping resistance, film appearance and pinhole resistance, but also to an excellent adhesion, even after immersion into water or when used for re-coating.

2. Multilayer Coatings MC-I7 to MC-I12, MC-C3 and MC-C4

The first aqueous coating materials X-I1 to X-I6 as well as X-C1 and X-C2 were mixed with a carbodiimide hardener (Carbodilite v-02-I2 from Nisshinbo Chemical, solid: 40% by wt.) in a ratio of first aqueous coating material to carbodiimide hardener of 100:10 to prepare first aqueous coating materials X-I7 to X-I12, X-C3 and X-C4.

TABLE 3

Prepared multilayer coatings MC-I1 to MC-17, MC-C1 and MC-C2 and test results for said multilayer coatings

|  |  | inventive |  |  |  |  |  | comparative |  |
|---|---|---|---|---|---|---|---|---|---|
|  |  | MC-I1 | MC-I2 | MC-I3 | MC-I4 | MC-I5 | MC-I6 | MC-C1 | MC-C2 |
| First aqueous coating material (X) |  | X-I1 | X-I2 | X-I3 | X-I4 | X-I5 | X-I6 | X-C1 | X-C2 |
| Second aqueous coating material (Y) |  | Y-I1 | Y-I2 | Y-I3 | Y-I4 | Y-I5 | Y-I6 | Y-C1 | Y-C2 |
| Chipping resistance [mm²/cm²] |  | 0.9 | 1.0 | 0.9 | 0.8 | 0.8 | 0.8 | 2.0 | 0.9 |
| Film appearance | Short-wave value | 9 | 10 | 8 | 7 | 7 | 7 | 14 | 10 |
|  | Long-wave value | 2 | 3 | 3 | 2 | 2 | 2 | 3 | 4 |
| Adhesion | Initial adhesion | OK | OK | OK | OK | OK | OK | OK | OK |
|  | After water resistance | OK | OK | OK | OK | OK | OK | Not OK | OK |
|  | Re-coated adhesion | OK | OK | OK | OK | OK | OK | OK | Not OK |
| Pinhole resistance [pinhole number] |  | 0 | 0 | 0 | 0 | 0 | 0 | 4 | 1 |

Multilayer coatings MC-I7 to MC-I12, MC-C3 and MC-C4 were then prepared as described above (see point 11 of "Methods of determination") using the respective carbodiimide containing first aqueous coating materials and the respective second aqueous coating materials as stated in Table 4. The inventive multilayer coatings MC-I7 to MC-I12 were compared to comparative multilayer coatings MC-C3 and MC-C4 regarding chipping resistance, film appearance, adhesion, and pinhole resistance. The obtained results are shown in Table 4.

TABLE 4

Prepared multilayer coatings MC-17 to MC-I12, MC-C3 and MC-C4 and test results for said multilayer coatings

| | inventive | | | | | | comparative | |
|---|---|---|---|---|---|---|---|---|
| | MC-17 | MC-I8 | MC-I9 | MC-I10 | MC-I11 | MC-I12 | MC-C3 | MC-C4 |
| First aqueous coating material (X) | X-17 | X-I8 | X-I9 | X-I10 | X-I11 | X-I12 | X-C3 | X-C4 |
| Second aqueous coating material (Y) | Y-I1 | Y-I2 | Y-I3 | Y-I4 | Y-I5 | Y-I6 | Y-C1 | Y-C2 |
| Chipping resistance [mm2/cm2] | 0.8 | 1.0 | 0.9 | 0.7 | 0.7 | 0.7 | 1.6 | 0.8 |
| Film appearance Short-wave value | 9 | 10 | 8 | 7 | 7 | 7 | 14 | 10 |
| Long-wave value | 2 | 3 | 3 | 2 | 2 | 2 | 3 | 4 |
| Adhesion Initial adhesion | OK | OK | OK | OK | OK | OK | OK | OK |
| After water resistance | OK | OK | OK | OK | OK | OK | Not OK | OK |
| Re-coated adhesion | OK | OK | OK | OK | OK | OK | OK | Not OK |
| Pinhole resistance [pinhole number] | 0 | 0 | 0 | 0 | 0 | 0 | 5 | 1 |

Comparative multilayer coating MC-C3 prepared from coating materials (X) and (Y) only comprising an aqueous dispersion of core/shell type particles (a) has a lower chipping resistance, film appearance, and pinhole resistance than inventive multilayer coatings MC-I7 to MC-I12, prepared from coating materials (X) and (Y) comprising the claimed combination of dispersions (a) and (b). Additionally, the adhesion after immersion in water is lower for the comparative multilayer coating MC-C3.

Use of polyurethane-polyurea dispersion (b) in aqueous coating materials (X) and (Y) (comparative multilayer coating MC-C4) leads to improved chipping resistance and adhesion after immersion in water as compared to multilayer coating MC-C3. However, the re-coated adhesion is decreased significantly.

In contrast, the use of a combination of an aqueous dispersion of core/shell type particles (a) and an aqueous polyurethane-polyurea dispersion (b) to prepare the inventive multilayer coatings MC-I7 to MC-I12 not only leads to excellent chipping resistance, film appearance and pinhole resistance, but also to an excellent adhesion, even after immersion into water or when used for re-coating. Moreover, the chipping resistance of the inventive multilayer coatings MC-I7 to MC-I12 can be further increased by addition of a carbodiimide hardener to the first aqueous coating materials as compared to inventive multilayer coatings MC-I1 to MC-I6 prepared without mixing a carbodiimide hardener with aqueous first coating materials.

The invention claimed is:
1. An aqueous coating composition, comprising:
(a) at least one aqueous dispersion of core/shell type particles comprising a polyurethane resin as the core portion and a crosslinked acrylic resin as the shell portion, wherein the particles are obtained by:

(i) initially charging an aqueous dispersion of at least one polyurethane resin (P) as core portion, and then
(ii) polymerizing a mixture of olefinically unsaturated monomers in the presence of the polyurethane core portion to obtain the crosslinked acrylic resin (A) shell portion,
wherein:
(ii-1) the polymerizing occurs in the presence of a water-soluble initiator;
(ii-2) a metered addition of the olefinically unsaturated monomers occurs such that a concentration of 6% by weight, based on a total amount of the olefinically unsaturated monomers, in a reaction solution of the polymerizing is not exceeded during the entire duration of the polymerizing; and
(ii-3) the mixture of the olefinically unsaturated monomers comprises at least one polyolefinically unsaturated monomer, and
(b) at least one aqueous polyurethane-polyurea dispersion comprising polyurethane-polyurea particles having an average particle size of 40 to 2,000 nm and a gel fraction of at least 50%, the polyurethane-polyurea particles contain, in each case in reacted form:
at least one polyurethane prepolymer (PP) comprising isocyanate groups and comprising anionic groups and/or groups which are configured to be converted into anionic groups, and
at least one polyamine (PA) comprising two primary amino groups and one or two secondary amino groups.

2. The aqueous coating composition as claimed in claim 1, wherein the glass transition temperature $T_g$ of the polyurethane resin (P) of the core portion is from −80° C. to 105° C., and/or wherein the glass transition temperature $T_g$ of the crosslinked acrylic resin (A) of the shell portion is from −60° C. to 80° C.

3. The aqueous coating composition as claimed in claim 1, wherein the polyurethane resin (P) of the core portion has an acid number of 10 to 60 mg KOH/g, and a OH number of 20 to 80 mg KOH/g.

4. The aqueous coating composition as claimed in claim 1, wherein the crosslinked acrylic resin (A) of the shell portion has an OH number of 10 to 140 mg KOH/g, and an acid number of 0 to 10 mg KOH/g.

5. The aqueous coating composition as claimed in claim 1, wherein the aqueous dispersion (a) has a gel content of 40 to 97% by weight, based on solids in the dispersion.

6. The method as claimed in claim 1, wherein the aqueous coating composition comprises the at least one aqueous dispersion (a) in a total amount of 0.5 to 50% by weight, based on the total amount of the aqueous coating composition.

7. The aqueous coating composition as claimed in claim 1, wherein the aqueous dispersion (b) has a gel fraction of 70% to 100%, based on the solids of the dispersion (b).

8. The aqueous coating composition as claimed in claim 1, wherein the polyurethane prepolymer (PP) comprises at least one polyester diol which is a product of a diol and a dicarboxylic acid, and wherein at least 50% by weight of the dicarboxylic acid in preparation of the at least one polyester diol is at least one dimer fatty acid.

9. The aqueous coating composition as claimed in claim 1, wherein the polyurethane prepolymer (PP) has an acid number, based on the solids content, of 10 to 35 mg KOH/g.

10. The aqueous coating composition as claimed in claim 1, wherein the polyurethane prepolymer (PP) has an isocyanate content of 0.5 to 6% by weight.

11. The aqueous coating composition as claimed in claim 1, wherein the at least one polyamine (PA) is at least one selected from the group consisting of diethylenetriamine, 3-(2-aminoethyl)-aminopropylamine, dipropylenetriamine, N1-(2-(4-(2-aminoethyl) piperazin-1-yl)ethyl) ethane-1,2-diamine, triethylenetetra-mine, and N,N'-bis(3-amino-propyl)ethylenediamine and mixtures thereof.

12. The aqueous coating composition as claimed in claim 1, wherein the aqueous coating composition comprises the at least one aqueous dispersion (b) in a total amount of 10 to 55% by weight, based on the total amount of the aqueous coating composition.

13. The aqueous coating composition as claimed in claim 1, wherein the composition comprises a weight ratio of the at least one aqueous dispersion of core/shell type particles (a) to the at least one aqueous polyurethane-polyurea dispersion (b) of 2:1 to 1:15, based on the solid content of the dispersions.

14. A method for forming a multilayer coating (MC) on a substrate(S) comprising the following steps:
    (1) coating a first aqueous coating material (X) directly on the substrate(S) to form an uncured first coating film (x),
    (2) coating a second aqueous coating material (Y) directly on the uncured first coating film obtained after step (1) to form an uncured second coating film (y),
    (3) coating a clear coating material (Z) directly on the uncured second coating film obtained after step (2) to form a clear coating film (z), and
    (4) simultaneously curing these three coating films obtained after steps (1) to (3), characterized in that the first aqueous coating material (X) and/or the second aqueous coating material (Y) are selected from the group consisting of an aqueous coating composition as claimed in claim 1.

15. A multilayer coating (MC) produced by the method as claimed in claim 14.

16. The aqueous coating composition as claimed in claim 1, wherein the aqueous coating composition is a pigmented aqueous basecoat composition.

17. The aqueous coating composition as claimed in claim 1, wherein the glass transition temperature $T_g$ of the polyurethane resin (P) of the core portion is from −60° C. to 80° C., and/or wherein the glass transition temperature $T_g$ of the crosslinked acrylic resin (A) of the shell portion is from −60° C. to 20° C.

18. The aqueous coating composition as claimed in claim 1, wherein the polyurethane resin (P) of the core portion has an acid number of 30 to 40 mg KOH/g.

19. The aqueous coating composition as claimed in claim 1, wherein the aqueous dispersion (a) has a gel content of 75 to 90% by weight, based on solids in the dispersion.

20. The aqueous coating composition as claimed in claim 1, wherein the aqueous coating composition comprises the at least one aqueous dispersion (a) in a total amount of 2 to 40% by weight, based on the total amount of the aqueous coating composition.

* * * * *